United States Patent
Altug et al.

(10) Patent No.: US 11,941,148 B2
(45) Date of Patent: *Mar. 26, 2024

(54) SYSTEMS AND METHODS FOR OPTIMAL PRIVACY-PRESERVING INFORMATION REVELATION

(71) Applicants: Yucel Altug, Redwood City, CA (US); Seda Aktas, Redwood City, CA (US)

(72) Inventors: Yucel Altug, Redwood City, CA (US); Seda Aktas, Redwood City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/106,824

(22) Filed: Feb. 7, 2023

(65) Prior Publication Data

US 2023/0185958 A1  Jun. 15, 2023

Related U.S. Application Data

(63) Continuation of application No. 16/840,776, filed on Apr. 6, 2020, now Pat. No. 11,574,076.

(60) Provisional application No. 62/829,504, filed on Apr. 4, 2019.

(51) Int. Cl.
*G06F 21/62* (2013.01)

(52) U.S. Cl.
CPC .. *G06F 21/6245* (2013.01); *G06F 2221/2115* (2013.01)

(58) Field of Classification Search
CPC ......... G06F 21/6245; G06F 2221/2115; G06F 21/625
USPC ............................................................ 726/26
See application file for complete search history.

(56) References Cited

U.S. PATENT DOCUMENTS

| 2014/0040172 A1* | 2/2014 | Ling ...................... G06N 5/022 706/12 |
| 2020/0242466 A1* | 7/2020 | Mohassel ................ H04L 9/008 |

* cited by examiner

*Primary Examiner* — Jeffrey C Pwu
*Assistant Examiner* — Nega Woldemariam
(74) *Attorney, Agent, or Firm* — K&L Gates LLP

(57) ABSTRACT

The present system relates a platform for addressing the optimal privacy-accuracy trade-off in the revelation of a user's valuable information to a third party. Specifically, the present system formalizes the privacy-accuracy trade-off in a precise mathematical framework, wherein mathematical formalization captures user's privacy preference with a single parameter. The system possesses a revelation method of user data that is optimal, in the sense of abiding by user's privacy preference while providing the most accurate description to third party subject to the aforementioned privacy preference constraint.

5 Claims, 7 Drawing Sheets

SYSTEMS AND METHODS FOR OPTIMAL PRIVACY-PRESERVING INFORMATION REVELATION

CROSS-REFERENCE TO RELATED APPLICATIONS

This application is a continuation of U.S. application Ser. No. 16/840,776 filed Apr. 6, 2020, which incorporates by reference and claims the benefit of priority to U.S. Provisional Application 62/829,504 filed on Apr. 4, 2019.

BACKGROUND OF THE INVENTION

This invention generally relates to data privacy, and specifically to techniques for addressing the optimal privacy-accuracy trade-off in the revelation of a user's valuable information to a third party.

Recent advances in communication and computing technologies have made the internet an indispensable part of people's daily life. The ubiquity of web-based systems and services, along with the data-driven nature of the majority of these systems and services, make data arguably the most significant commodity of the $21^{st}$ century. Indeed, utilization of user data is ubiquitous in contemporary systems and services, such as product recommendations, targeted advertising, personal assistants, navigation services, etc.

However, there is an inherent tension between the utility of user data and privacy of the user. Intuitively, this tension should be clear: as the user allows more of her data to be accessed by a service, the utility of that service increases since said service gains a better understanding of the user. Yet, by revealing more data to the service, the user exposes herself against possible privacy losses. Thus, when the user data is revealed to a third party for utility, the simultaneous quantification of the reduction in user's privacy and the amount of utility gain due to the said revelation is a problem of great significance, since such a quantification could allow the user to adjust how much she reveals and/or to seek quantifiable incentives for her revelation. The solution of this problem, however, necessitates a precise understanding of the trade-off between the utility of user data and the privacy of the user, as well as the characterization of the optimum trade-off between utility and privacy.

Although there are several studies that aim to formalize privacy loss associated with data release, as well as the trade-off between privacy and utility, none of them can be the complete solution of the aforementioned problem, as will be outlined next.

Specifically, a rich vein of studies aims to formalize quantification of privacy loss due to public disclosure from a private information source. See the survey by I. Wagner and D. Eckhoff entitled "Technical privacy metrics: a systematic survey," ACM Computing Surveys (CSUR), vol. 51, no. 3, 2018, and references therein, the entirety of which are incorporated herein by reference. Since the focus of these works is to quantify privacy loss, they all treat the third party as an adversary, and hence they do not involve an explicit trade-off between privacy and utility.

Introduced by C. Dwork and co-workers, differential privacy, which is arguably the first study that recognizes the need to address the privacy-utility trade-off, lead to substantial amount of follow up work, see the survey by C. Dwork and A. Roth entitled "The algorithmic foundations of differential privacy," Foundations and Trends® in Theoretical Computer Science, vol. 9, no. 3-4, pp. 211-407, 2014, and references therein, the entirety of which are incorporated herein by reference. In its essence, differential privacy aims to restrict privacy loss individuals suffer when queries are made to a database that stores their information. On a high level, differential privacy formalizes the following observation: in order to protect individuals' privacy, answers to the queries should be corrupted by a certain amount of noise, whose statistics are dictated by the amount of privacy individuals would like to maintain. Since the data revelation is restricted to queries to the databases, differential privacy is too restrictive to provide a complete characterization of the trade-off between privacy and utility.

There are various generalizations of differential privacy aiming to formalize a privacy-utility trade-off. These generalizations possess at least one of the following two properties: First, most of these conventional systems that tackle privacy-utility trade-off assume the user data is partitioned into private-public components and model privacy (resp. utility) in terms of a relation between private user data and revealed data (resp. public user data and revealed data). Second, the conventional systems typically minimize the privacy loss user experiences subject to a utility constraint on third party's observation. Both properties have particular shortcomings, which, in turn, make the conventional systems inadequate as far as addressing the problems related to the trade-off between the utility of user data and the privacy of the user, as well as the characterization of the optimum trade-off between utility and privacy, as described above. These shortcomings are explained next.

One shortcoming of a private-public separation of user data is that the incentives of the data owner, i.e., user, and the utility-seeking party, i.e., third party, are not necessarily aligned with respect to the definition of this separation. In other words, a privacy-seeking user would prefer to keep all the data private whereas a utility-seeking party would prefer to make all the data public. Thus, one might need to prioritize one of the party's desire to define this separation.

Another shortcoming lies in devising a precise definition of such a separation, since it should consider desires of all possible users and third parties, which, in turn, makes scaling such a system quite challenging.

Yet another significant shortcoming of a private-public separation of user data is that in a typical scenario, a less-informed user could tend to pick only sensitive information, such as name, social security number, address, etc., as the private data. As such, all the non-sensitive information becomes public data, hence she would not have a control on how much of her data is shared and/or the system cannot measure the amount of privacy loss she experiences. It will be clear to those skilled in the art that sensitive data should never be a part of this trade-off. Hence the aforementioned scenario is useless in terms of capturing privacy-accuracy trade-off.

If, however, one tries to extend the current paradigm to address the aforementioned shortcoming, then almost all of the known methods of measuring privacy and accuracy somewhat trivializes. Specifically, almost all of the conventional systems measure both privacy and accuracy in an "algorithm-independent" way. Although such a methodology is adequate for privacy, it is not quite appropriate for accuracy, since third party does not primarily care about "archival quality" of her observation but rather its "utility" in making a decision based on it at that point in time. As such, measuring the utility in an algorithm-dependent manner is practically more meaningful to devise systems that accomplish privacy-adjusted data revelation.

A significant shortcoming of minimizing the privacy loss user experiences subject to an accuracy constraint on third party's observation is the fact that said formulation prioritizes the utility of third party over the privacy of the user. In light of the current privacy concerns of society, this deprioritization of the user privacy could result in the public refraining from using services employing such formulations. Accordingly, there is a need to maximize the accuracy of third party's inference subject to a privacy constraint.

Accordingly, there is a need for a system that addresses the privacy-adjusted revelation of user data problem in an operationally meaningful and scalable way, since the conventional systems cannot achieve this goal. Specifically, one can criticize the conventional separation of user data into private-public parts because such a separation assumes some part of user's data could be revealed without a restriction. However, one should exactly quantify the amount of information user reveals, i.e., privacy loss she experiences, with respect to all of her data, so that she can be compensated for her revelation and/or control the amount of revelation. Further, conventional formulations prioritize third party's accuracy over the user's privacy. In light of the current privacy concerns of the society, user's privacy should be prioritized in order to build successful businesses based on the privacy-adjusted revelation of user data.

SUMMARY OF THE INVENTION

The present system addresses the privacy-adjusted revelation of user data problem in an operationally meaningful and scalable way by achieving the following three goals: (1) the system formalizes the privacy-accuracy trade-off in a precise mathematical framework without a private-public separation of user data; (2) aforementioned mathematical formalization captures user's privacy preference with a single parameter; and (3) the system possesses a revelation method of user data that is optimal, in the sense of abiding by user's privacy preference while providing the most accurate description to third party subject to the aforementioned privacy preference constraint.

The present system facilitates the revelation of a valuable information from its owner to a third party, who is willing to compensate the owner to obtain the valuable information, in a privacy-preserving manner. The defining feature of the system is that it guarantees the owner of valuable information to maintain any privacy level of her choice while ensuring the recipient, i.e., third party, to benefit maximally from the revelation subject to the specified level of privacy.

In an example, a user possesses a valuable information that is of importance to another party, e.g., "third party". The kind and form of the sought-after valuable information might be quite diverse. For instance, valuable information might be a user's likelihood of purchasing a merchandise, location history, susceptibility to certain diseases, etc.

The valuable information might possess different properties. For instance, it might be time-varying or time-invariant. Examples of time-varying valuable information include likelihood of purchasing merchandise, location history, etc. Instances of time-invariant valuable information include user's whole genome sequence, susceptibility to certain diseases, etc. The valuable information might be directly observable or needs to be inferred from a relevant meta-data source by a noise-prone process. Examples of directly available valuable information include user's location history, susceptibility to certain diseases, etc. Instance of valuable information that needs to be inferred from a meta-data source include user's whole genome sequence, user's likelihood of purchasing a merchandise based on her web history, etc. It should be noted that this invention is capable of operating in all these different types of valuable information scenarios.

The user may be willing to provide her valuable information in exchange for a quantifiable incentive, e.g., monetary payments, discounted products, etc. The user may not be willing to reveal her information entirely, since such a revelation will incur a total loss of privacy. She can, however, tolerate a certain amount of privacy loss. Nevertheless, there is an inherent tension between the amount of privacy loss user experiences and the utility of information she provides to the third party, i.e., accuracy of the third party's inference of user's valuable information.

Therefore, in order to facilitate a transaction in which user specifies a privacy-preference, and this specification is guaranteed to be abided by, and the revelation of user's valuable information to the third party is provably the most accurate such revelation possible subject to user's privacy preference, one needs a system that accomplishes the following tasks: (1) extracts the valuable information from the meta data source it is contained; (2) estimates the statistics of the noise introduced in the aforementioned extraction process and updates the prior knowledge about the valuable information; (3) computes the stochastic mapping that achieves the optimal privacy-accuracy trade-off with respect to user's privacy preference, as a function of the aforementioned extracted valuable information, estimated statistics of the noise and updated prior knowledge; and (4) transforms the extracted valuable information via above-mentioned stochastic mapping to yield user's revelation to third party. Optimally estimates valuable information based on aforementioned revelation and outputs this estimate, along with the accuracy of the estimate.

In one example, a method of preserving privacy in a data set used to estimate information that is valuable to a third party includes the steps of: receiving a user's privacy preference including one or more privacy instructions defining what a user is or is not willing to share regarding a valuable information data set; using the valuable information data set and the user's privacy preference as inputs, producing a privacy-adjusted valuable information data set and a privacy-preserving stochastic map describing the mechanism used to produce the privacy-adjusted valuable information data set; and using the privacy-adjusted valuable information data set, and the privacy-preserving stochastic map as inputs, applying a stochastic inference algorithm to produce an estimate of the valuable information data set and an estimation error value.

The privacy-adjusted valuable information data set may be constrained to meet every requirement included within the user's privacy preference inputs.

The method may include the step of extracting a valuable information data set from a first data source.

The method may include the step of producing extraction noise statistics describing the noise introduced into the data set by the extraction. The extraction noise statistics may be an additional input used to produce the privacy-adjusted valuable information data set and a privacy-preserving stochastic map describing the mechanism used to produce the privacy-adjusted valuable information data set.

The method may include the step of updating a prior knowledge data set based on information derived from one or more elements of the first data source. The updated prior knowledge data set may be an additional input used to produce the privacy-adjusted valuable information data set and a privacy-preserving stochastic map describing the mechanism used to produce the privacy-adjusted valuable information data set.

The valuable information data set that is subject to privacy adjustment may be time-variant or time-invariant.

The valuable information data set that is subject to privacy adjustment may be directly available or may be inferred from a first data set. The estimate of the valuable information data set may be an estimate of the user's likelihood of taking a given action. The first data set may be a web browsing history. The user's likelihood of taking a given action may be the user's likelihood of purchasing a given product within a given timeframe. The estimate of the valuable information data set may be an estimate of the user's likelihood of being in a given location within a given timeframe and the first data set may be a history of a user's locations. The estimate of the valuable information data set may be an estimate of the user's likelihood of having a given genetic trait, the first data set may be the user's DNA, and the valuable information data set may be produced using a DNA sequencer.

The step of producing the privacy-adjusted valuable information data set and the privacy-preserving stochastic map describing the mechanism used to produce the privacy-adjusted valuable information data set may include producing the privacy-preserving stochastic map using an updated prior knowledge data set, the user's privacy preference, and the extraction noise statistics as inputs and then applying the privacy-preserving stochastic map to an extracted valuable information data set to produce the privacy-adjusted valuable information data set. The prior knowledge data set may be a probability distribution over a set from which the valuable information data set can take its values; the user's privacy preference may include a condition enabling the user to control a statistical distance between the privacy-adjusted valuable information data set and the valuable information data set; the stochastic inference algorithm may minimize an estimation error, wherein the estimation error may be defined by the expected value of a distance between the valuable information data set and the estimate of the valuable information data set, where the distance may be measured with respect to a given loss function; and the privacy-preserving stochastic map may minimize the stochastic inference algorithm's estimation error subject to the user's privacy preference.

The statistical distance may be defined as a convex functional of the conditional distribution between the privacy-adjusted valuable information data set and the valuable information data set; a loss function defining an induced expected distance between the valuable information data set and the estimate of the valuable information data set may be a concave functional of the conditional distribution between the privacy-adjusted valuable information data set and the valuable information data set; and the privacy-preserving stochastic map may be computed by a two-step procedure comprising: a polyhedral set of all possible maps may be partitioned into sub-polyhedral regions; and a convex maximization algorithm may be carried out over each convex set defined by an intersection of every sub-polyhedral region with a set of maps that satisfy user's privacy-preference.

In another example, a system for preserving privacy in a data set used to estimate information that is valuable to a third party includes: a valuable information data set; a user's privacy preference including one or more privacy instructions defining what a user is or is not willing to share regarding the valuable information data set; and a processor including memory storing instructions that, when executed, cause the processor to: produce a privacy-adjusted valuable information data set and a privacy-preserving stochastic map describing the mechanism used to produce the privacy-adjusted valuable information data set using the valuable information data set and the user's privacy preference as inputs; and apply a stochastic inference algorithm to produce an estimate of the valuable information data set and an estimation error value using the privacy-adjusted valuable information data set and the privacy-preserving stochastic map as inputs.

The privacy-adjusted valuable information data set may be constrained to meet every requirement included within the user's privacy preference inputs.

The processor may further extract a valuable information data set from a first data source.

The processor may further produce extraction noise statistics describing the noise introduced into the data set by the extraction. The extraction noise statistics may be an additional input used to produce the privacy-adjusted valuable information data set and a privacy-preserving stochastic map describing the mechanism used to produce the privacy-adjusted valuable information data set.

The processor may further update a prior knowledge data set based on information derived from one or more elements of the first data source. The updated prior knowledge data set may be an additional input used to produce the privacy-adjusted valuable information data set and a privacy-preserving stochastic map describing the mechanism used to produce the privacy-adjusted valuable information data set.

The valuable information data set that is subject to privacy adjustment may be time-variant or time-invariant.

The valuable information data set that is subject to privacy adjustment may be directly available or inferred from a first data set.

The estimate of the valuable information data set may be an estimate of the user's likelihood of taking a given action. The first data set may be a web browsing history. The user's likelihood of taking a given action may be the user's likelihood of purchasing a given product within a given timeframe. The estimate of the valuable information data set may be an estimate of the user's likelihood of being in a given location within a given timeframe and the first data set is a history of a user's locations. The estimate of the valuable information data set may be an estimate of the user's likelihood of having a given genetic trait, the first data set is the user's DNA, and the valuable information data set is produced using a DNA sequencer.

The system of claim 20, wherein the processor further produces the privacy-adjusted valuable information data set and the privacy-preserving stochastic map describing the mechanism used to produce the privacy-adjusted valuable information data set including producing the privacy-preserving stochastic map using an updated prior knowledge data set, the user's privacy preference, and the extraction noise statistics as inputs and then applies the privacy-preserving stochastic map to an extracted valuable information data set to produce the privacy-adjusted valuable information data set.

The prior knowledge data set may be a probability distribution over a set from which the valuable information data set can take its values; the user's privacy preference may include a condition enabling the user to control a statistical distance between the privacy-adjusted valuable information data set and the valuable information data set; the stochastic inference algorithm may minimize an estimation error, wherein the estimation error may be defined by the expected value of a distance between the valuable information data set and the estimate of the valuable information data set, where the distance may be measured with respect to a given loss function; and the privacy-preserving stochastic map may minimize the stochastic inference algorithm's estimation error subject to the user's privacy preference.

The statistical distance may be defined as a convex functional of the conditional distribution between the privacy-adjusted valuable information data set and the valuable information data set; a loss function defining an induced expected distance between the valuable information data set and the estimate of the valuable information data set may be a concave functional of the conditional distribution between the privacy-adjusted valuable information data set and the valuable information data set; and the privacy-preserving stochastic map may be computed by a two-step procedure comprising: a polyhedral set of all possible maps may be partitioned into sub-polyhedral regions; and a convex maximization algorithm may be carried out over each convex set defined by an intersection of every sub-polyhedral region with a set of maps that satisfy user's privacy-preference.

The statistical distance measure may be a convex functional of the conditional distribution between the valuable information and the revelation to third party, such as relative entropy.

The induced expected loss, i.e., the estimation error, may be a concave functional of the conditional distribution between the valuable information and the revelation to third party, such as zero-one loss.

The convex maximization algorithm may be an outer-approximation via projections. A maximizer of these sub-problems may be declared to be privacy-preserving stochastic map.

An advantage of the present approach is that it ensures a privacy guarantee to the user whereas the current formulations ensure a utility guarantee to third party. Thus, the present formulation prioritizes the privacy of the user whereas existing formulations prioritize the utility of the third party. This "duality" between the formulations has the following implication: the notion constrained, i.e., privacy or accuracy, underlines the priority of the system designer.

DETAILED DESCRIPTION OF THE DRAWINGS

Figure 1:
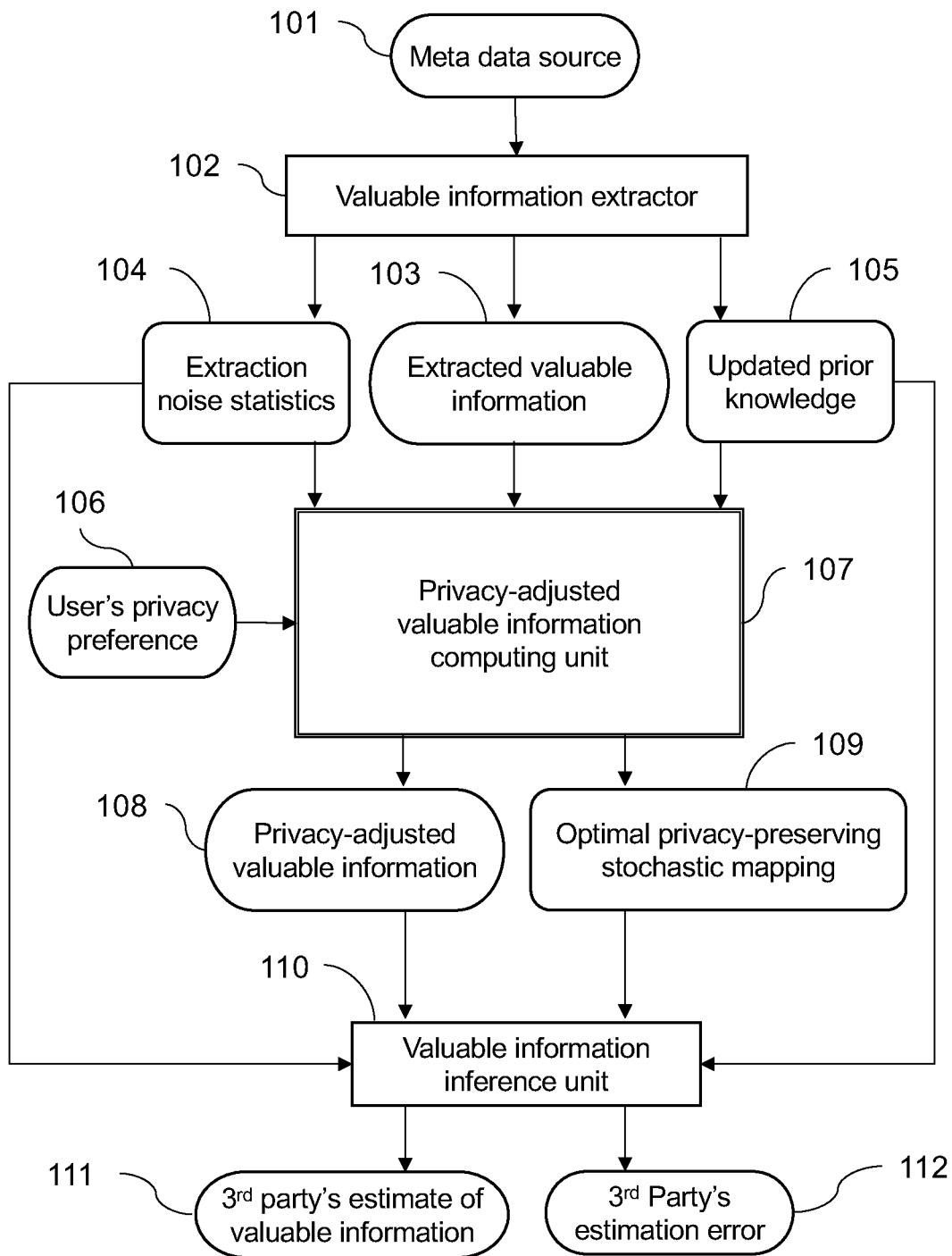
FIG. 1 is a block diagram of the system that facilitates optimal privacy-preserving data revelation form one party to another party.

FIG. 1 is a block diagram illustrating an example of the present system that reveals a privacy-adjusted version of a valuable user information to a third party. The revelation generated by the system achieves the optimal privacy-accuracy trade-off subject to user's privacy preference. The overall operation of the system is accomplished in three main steps. Valuable information extractor 102, Privacy-adjusted valuable information computing unit 107, and valuable information inference unit 110. Next, we explain these steps.

The meta data source 101 contains the valuable information of the user. Valuable information extractor 102 takes this as input and processes it to produce extracted valuable information 103, along with statistics of the noise introduced in this process as extraction noise statistics 104 and updated prior knowledge 105.

In some examples of the system, meta data source 101 is the readily available valuable information itself, hence unit 102 does not perform any processing, thus 104 is identity mapping, i.e., there is no noise in the extraction process, and 105 is the initial prior knowledge, i.e., there is no update on the prior knowledge of valuable information. Examples of such embodiments include susceptibility to a certain disease due to family history.

In some embodiments of the system, the valuable information is not readily available in 101, hence 102 performs a process to distill the valuable information from the meta data source 101. For example, if the valuable information is the susceptibility to a certain disease due to inherited genetic mutations in certain genes, then 102 needs to perform a measurement operation that is prone to imperfections, i.e., noise. Thus, in such embodiments extraction noise statistics 104 is not identity, but the estimated statistics of the introduced noise, whereas 105 is still the initial prior knowledge, since the sought-after valuable information here is time-invariant, by definition.

In some embodiments of the system, the valuable information is neither readily available in 101 nor time-invariant. For example, user's likelihood to purchase a merchandise varies in time and is not directly observable. As such, for the embodiments of the system for which valuable information is the aforementioned likelihood, this information should be inferred from a relevant meta data source, such as user's web history, by using a certain fraction of this meta data source, such as past web activity, as a training set. Therefore, in such examples, system outputs both statistics of the noise introduced in this process, i.e., 104, as well as updated prior knowledge, i.e., 105, gained through this training process.

In light of the above examples, it will be clear to those skilled in the art that the operation of 102, and hence its outputs, are directly dictated by the type of the valuable information, and hence the meta data source 101 including it. For example, if the valuable information is whether user has genetic mutations in certain genes, which, in turn, increases her susceptibility to certain diseases, then 102 might be a DNA sequencing system, along with its data processing pipeline. Extracted valuable information 103 is a noisy observation of whether the user has genetic mutations. Hence, outputs of the system are this noisy observation, along with the statistics of the noise introduced by the aforementioned measurement process. Note that prior knowledge on whether user has these genetic mutations is agnostic to the aforementioned extraction process.

As another example, if the valuable information is user's likelihood to purchase a merchandise, then 102 might be a data mining procedure implemented on a computer or a mobile device on which meta data source is generated and/or stored. By using a certain amount of user's past web activity, this procedure might be trained to obtain a potentially noisy observation of the valuable information, as well as to estimate the parameters of an underlying dynamical model that governs the valuable information which is not directly observable, and the statistics of the observation noise 104. Due to the dynamic nature of this procedure, system also produces an updated prior knowledge 105 about the valuable information as one of its outputs.

There are three relevant valuable information types: (i) directly available, (ii) not-directly available and time-invariant, and (iii) not-directly available and time-varying. Note that if the valuable information is directly available, whether it's time-invariant is irrelevant. (i) For the first case, the only non-trivial output of 102 is 103, since there is no noise introduced and prior knowledge need not be updated. (ii) For the second case, the system introduces observation noise, so 103 and 104 are the non-trivial outputs of 102. Time-invariant nature of the valuable information ensures prior knowledge does not need to be updated. (iii) Finally, for the third case, 103, 104, and updated prior knowledge 105 are all non-trivial outputs of 102.

Privacy-adjusted valuable information computing unit 107 performs the core operation of the system by taking extracted valuable information 103, extraction noise statistics 104, updated prior knowledge 105, and user's privacy preference 106 as inputs and creating privacy-adjusted valuable information 108, along with the optimal privacy-preserving stochastic mapping 109. The optimal privacy-preserving stochastic mapping 109 is also utilized in the system to create 108, as explained below.

Figure 2:
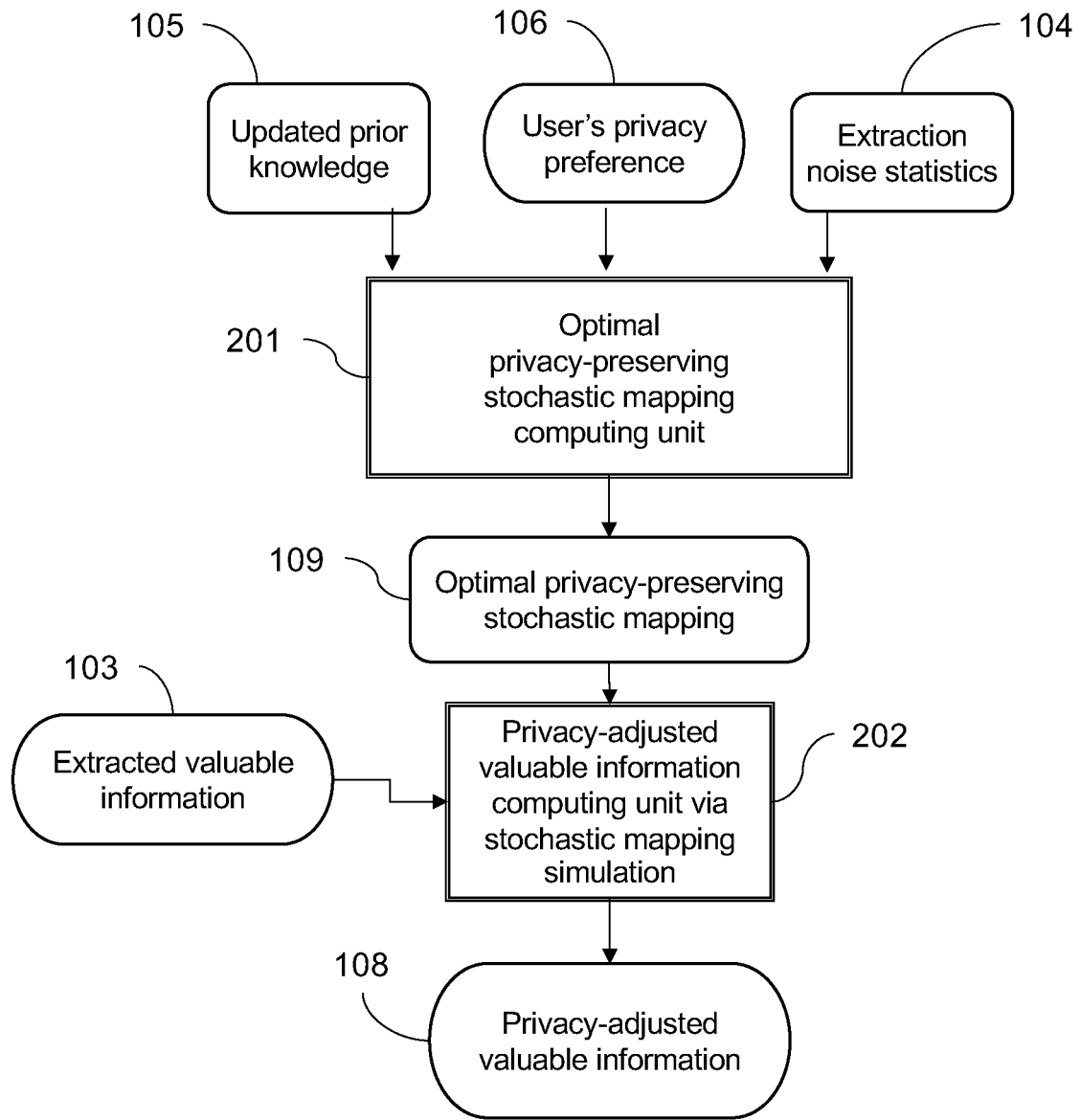
FIG. 2 is a block diagram outlining the operation of the privacy-adjusted valuable information computing unit, given in FIG. 1.

FIG. 2 includes a block diagram of the operation performed by the unit 107, which consists of two main components. The first component, i.e., optimal privacy-preserving stochastic mapping computing unit 201 takes updated prior knowledge 105, user's privacy preference 106, and extraction noise statistics 104 as inputs and computes the optimal privacy-preserving stochastic mapping 109. The optimal privacy-preserving stochastic mapping 109 ensures that the overall system possesses the following properties: User's privacy preference 106 can be abided by when a privacy-adjusted version of the extracted valuable information is revealed to the third party, wherein the inference of the valuable information based on the revelation is the most accurate version possible subject to the aforementioned privacy constraint. The second component, i.e., privacy-adjusted valuable information computing unit via stochastic mapping simulation 202, takes optimal privacy-preserving stochastic mapping 109 and extracted valuable information 103 as inputs and computes privacy-adjusted valuable information 108 as its output. The operation of this unit is transforming 103 according to the stochastic mapping computed by 201, i.e., 109, and performed via a pseudo-random number generator that simulates the stochastic mapping specified by 109. The system can result in the privacy-adjusted valuable information 108, which ensures that user maintains the level of privacy she specified, whereas third party, who is the recipient of 108, derives maximum possible benefit from 108 subject to the constraint of satisfying user's privacy preference.

It should be noted that privacy-adjusting operation of 107 is optimal, as reflected by the optimality of 109, in the sense that it creates a version of extracted valuable information 103 such that it abides by the privacy preference of the user and the inference of the valuable information based on the revelation is the most accurate possible subject to the constraint that privacy preference of the user should be satisfied. The notions of privacy and accuracy mentioned above are formalized in terms of precise mathematical definitions disclosed herein.

Finally, in FIG. 1, the last operation of the system is performed by the valuable information inference unit 110 that takes updated prior knowledge 105, extraction noise statistics 104, privacy-adjusted valuable information 108, and optimal privacy-preserving stochastic mapping 109 and outputs third party's estimate of the valuable information 111, along with the estimation error of this procedure 112. The statistical inference, i.e., estimation, procedure performed here will be explained in detail in conjunction with the detailed explanation of the computation of optimal privacy-preserving stochastic mapping 109 in the following sections, since the accuracy of 111, or equivalently its estimation error 112, is central to the notion of optimal privacy-accuracy trade-off mentioned above.

It should be noted that in some examples of the system, third party may want to perform the statistical inference step by herself. In those scenarios, the output of the system would be 104, 105, 108, and 109, so that the operation of valuable information inference unit 110 can be performed by third party herself.

Description of Optimal Privacy-Preserving Stochastic Mapping Computing Unit.

The optimal privacy-preserving stochastic mapping 109, which is the output of optimal privacy-preserving stochastic mapping computing unit 201, is used to create the privacy-adjusted revelation of the extracted valuable information of the user. The optimality is in the sense of achieving the optimal trade-off between user's privacy and third party's utility, i.e., accuracy. In order to formalize the trade-off between privacy and accuracy, one needs to a have precise way of quantifying both privacy and accuracy. Quantification of these notions, however, necessitates a rigorous mathematical framework. To this end, the system includes a statistical framework to formalize privacy and accuracy.

Statistical Model.

Figure 3:
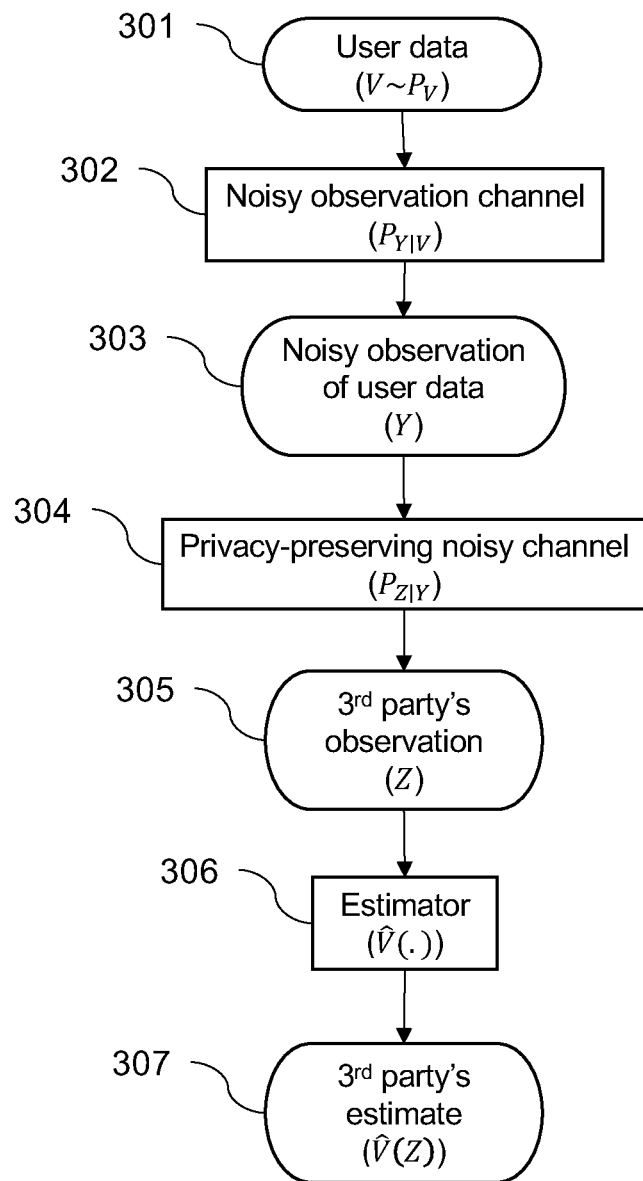
FIG. 3 is a block diagram of the statistical model that encapsulates the relevant notions to formalize privacy and accuracy.

The optimal privacy-preserving stochastic mapping 109 depends on both the statistics of the noise introduced 104 in the extraction of the valuable information and the estimation procedure employed in the valuable information inference unit 110. Therefore, any attempt to formalize the optimal privacy-accuracy trade-off should account for this interplay. In order to capture this interplay in the system depicted in FIG. 1, we introduce the stochastic model that is depicted in FIG. 3. This model not only generalizes the relevant parts, as far as the sought-after notions of optimality of this section are concerned, in FIG. 1, but also places them into a precise mathematical framework.

User data 301, which will be denoted by V henceforth, is assumed to be distributed according to a probability mass function (p.m.f.) $P_V$, which will be called prior distribution of user data henceforth. It is assumed that V takes values in the set $V:=\{1, \ldots, K_V\}$, where $K_V \in \{2, 3, \ldots\}$. A noisy observation of user data 303, which will be denoted by Y henceforth, is available. It is assumed that Y takes values in the set $y:=\{1, \ldots, K_Y\}$, where $K_Y \in \{2, 3, \ldots\}$. Further, Y is the output of a stochastic mapping $P_{Y|V}: V \to y$ with V as the input of this mapping. In other words, Y is the output of a noisy observation channel 302 with input V, where the channel noise is induced by the stochastic mapping $P_{Y|V}$. Third party's observation regarding user data is 305, which will be denoted by Z henceforth. It is assumed that Z takes values in the set $Z:=\{1, \ldots, K_Z\}$, where $K_Z \in \{2, 3, \ldots\}$. Similar to Y, Z is the output of a stochastic mapping $P_{Z|Y}: y \to z$ with Y as the input of this mapping. In other words, Z is the output of a privacy-preserving noisy channel 304, which performs the main operation of the model. Third party's estimate of user data 307, which will be denoted by $\hat{V}(Z)$ henceforth, is generated by the estimator 306, which is a (potentially stochastic) mapping denoted by $\hat{V}:z \to \hat{v}$, where $\hat{v}$ is a subset of real numbers that is a superset of v, i.e., the set in which V takes values. It should be noted that while it is customary to restrict the range of an estimator to the set in which the random variable that is aimed to be estimated takes values, aforementioned generalization is advantageous in terms of enabling a wider range of loss functions to be handled, as it will be evident in what follows.

User data 301, i.e., V, corresponds to the valuable information of the user, which is contained in her meta data source 101. The valuable information may not be readily available in meta data source, and hence may need to be extracted. The transformation of V to Y by means of $P_{Y|V}$ captures this extraction process. Specifically, Y, i.e., noisy observation of user data 303, represents the extracted valuable information 103 and $P_{Y|V}$, i.e., noisy observation channel 302, corresponds to the extraction noise statistics 104 in Section 2. $P_V$, which encapsulates the prior knowledge regarding user data, corresponds to updated prior knowledge 105 on the valuable information. $P_{Z|Y}$, i.e., privacy-preserving noisy channel 304, represents the statistics of the mapping carried out in privacy-adjusted valuable information computing unit 107. Z, i.e., third party's observation 305, corresponds to the privacy-adjusted valuable information 108. The operation of valuable information inference unit 110 is captured by the estimator 306 in FIG. 3, whereas $\hat{V}(Z)$ 307 corresponds to third party's estimate of valuable information 111.

FIG. 3 distills the operation of the system by introducing noisy observation channel 302 to represent the operation of valuable information extractor 102, and generalizing the operation of privacy-adjusted valuable information computing unit 107 by allowing the usage of any privacy-preserving noisy channel 304, not necessarily the optimal privacy-preserving stochastic mapping. If the privacy-preserving noisy channel 304 is chosen optimally, which is exactly the operation of optimal privacy-preserving stochastic mapping computing unit 201, then the model reduces to the system. Therefore, characterization of the operation of optimal privacy-preserving stochastic mapping computing unit 201 is equivalent to a system designer's computation of the optimal privacy-preserving noisy channel subject to a privacy-preference provided by the user.

FIG. 3 follows a Bayesian framework. In this framework, V, Y, and Z form a Markov chain in that order, i.e., V and Z are statistically independent conditioned on Y. In terms of the joint distribution of V, Y, and Z, i.e., $P_{VYZ}$, the aforementioned Markov condition is equivalent to the following:

$$P_{VYZ} = P_V P_{Y|V} P_{Z|Y} \tag{1}$$

It is assumed that prior distribution of user data 301, i.e., $P_V$, statistics of the noisy observation channel 302, i.e., $P_{Y|V}$, and the statistics of the privacy-preserving noisy channel 304, i.e., $P_{Z|Y}$, are known to both system designer and third party.

A brief explanation of the operational meanings of the distributions on the right side of (1) is next. $P_V$ encapsulates the prior knowledge of both system designer and third party regarding user data 301. As such, one cannot expect either of the said parties to be able to control it. $P_{Y|V}$ models the imperfection(s) of the system's observation of user data, in particular it accounts for the noise in the system's observation process of user data. $P_V$ and $P_{Y|V}$ can be assumed to be arbitrary but fixed distributions and channels, respectively. Finally, $P_{Z|Y}$ introduces a certain amount of noise to 303, i.e., Y, according to user's privacy preference to create third party's observation 305, i.e., Z. Recalling the main goal of the model, i.e., to reveal a version of user data to the third party such that the privacy loss user experiences satisfies her privacy preference while third party's observation is as accurate as possible, statistics of this privacy-preserving noisy channel 304, i.e., $P_{Z|Y}$, is the main design variable system designer chooses. As such, by optimally choosing $P_{Z|Y}$, system designer needs to achieve the following competing goals: (1) user's privacy preference is satisfied; and (2) third party's estimate 307, when it is generated by an estimator 306 that is optimal in a precise mathematical sense, is as accurate as possible.

In the following sections, the notions of optimality in system designer's choice of privacy-preserving noisy channel 304, and in third party's estimate 307, are formalized.

Optimum Privacy-Preserving Noise Channel.

The characterization of the optimum privacy-preserving noisy channel, which will be denoted by $P_{Z|Y}^*$ henceforth, is accomplished by imposing the privacy of the user as a constraint and optimizing the accuracy of the third party's estimate subject to this constraint. In mathematical terms, $P_{Z|Y}^*$ is a maximizer of the following optimization problem:

$$\max_{P_{Z|Y}: f_{priv}(P_V, P_{Y|V}, P_{Z|Y}) \leq r_o} f_{acc}(P_V, P_{Y|V}, P_{Z|Y}) \tag{2}$$

where the maximum is over all noisy channels from y to z, which will be denoted by p(z|y) henceforth, $f_{priv}(P_V, P_{Y|V}, P_{Z|Y})$ is a normalized measure of privacy, $f_{acc}(P_V, P_{Y|V}, P_{Z|Y})$ is a measure of accuracy, and $r_o \in [0,1]$ is the privacy preference of the user, which captures the privacy loss user can tolerate. Specifically, $r_o = 1$ means user is indifferent about privacy loss, $r_o = 0$ means she does not want any privacy loss at all.

From a practical perspective, arguably the most relevant embodiments of the model depicted in FIG. 3 are the ones for which the privacy-preserving noisy channel 304 is chosen optimally. When such an optimal privacy-preserving noisy channel is used, the observation of third party 305 is also optimal in this sense. As such, optimal 304 plays an important role in practical implementations based on the model depicted in FIG. 3. Specifically, this quantity is captured by the following definition: Z is called a privacy-preserving sufficient statistic of Y for V with respect to ($f_{priv}$, $f_{acc}$, $r_o$) if it is the output of a noisy channel $P_{Z|Y}^*$ that attains (2) when Y is the input.

It should be noted that (2) formalizes the privacy-accuracy trade-off for the system depicted in FIG. 1. Specifically, once the measures of privacy and accuracy are selected, one can compute the optimizer in (2) to implement the said system. Further, it should also be noted that the notion of privacy-preserving sufficient statistic corresponds to the privacy-adjusted valuable information 108 of the system depicted in FIG. 1.

It will be evident to those skilled in the art that the choices of privacy and accuracy measures, i.e., $f_{priv}$ and $f_{acc}$, in (2) determine the specific form of the optimization problem. Thus, in order to devise a system that computes $P_{Z|Y}^*$ operationally meaningful choices of accuracy and privacy are required, which will be explained in the following sections.

Statistical Measures of Accuracy.

Typically, performance of a statistical inference procedure in Bayesian framework, in which the model described in FIG. 3 is devised, is measured in terms of its ability to minimize the expected value of a loss function. The choice of loss function depends on particular applications said inference procedure will be used. Specifically, a loss function $l(.,.)$ is a non-negative mapping defined on the cartesian product of the sets $V$ and $\hat{V}$ take their values, i.e., $l: V \times \hat{V} \to [0, \infty)$. Thus, for a given loss function $l(...)$, accuracy of an estimator $\hat{V}(.)$ is measured in terms of the following quantity:

$$\mathbb{E}[\ell(V, \hat{V}(Z))] := \sum_{v,z} P_{VZ}(v, z)\ell(v, \hat{V}(z)) \qquad (3)$$

where $\mathbb{E}[.]$ denotes the expectation operator and $P_{VZ}$ denotes the joint distribution of $V$ and $Z$, defined by:

$$P_{VZ}(v, z) := \sum_y P_V(v) P_{Y|V}(y \mid v) P_{Z|Y}(z \mid y) \qquad (4)$$

From a practical point of view, arguably the most important case is when the estimator 306 third party uses to form her estimate 307 is optimal. As such, said estimator will be assumed to be optimal henceforth.

In light of the above discussion on the practical merit of using an optimal estimator in 306, following is an operationally meaningful choice for an accuracy measure, given a loss function:

$$f_{acc}(P_V, P_{Y|V}, P_{Z|Y}) := c - \min_{\hat{V}: \mathcal{Z} \to V} \mathbb{E}[\ell(V, \hat{V}(Z))] \qquad (5)$$

for a constant $c$ whose choice is a part of the definition of the accuracy measure.

The minimum in (5) can depend on the choice of the loss function. Thus, a complete characterization of the accuracy measure defined in (5) necessitates to particularize a loss function. Two widely used loss functions in statistics literature are the zero-one and squared-error loss functions, defined as:

$$\ell_{0-1}: V \times \hat{V} \to \{0, 1\} \text{ such that } \ell_{0-1}(v, \hat{v}) := \begin{cases} 0, & v = \hat{v} \\ 1, & v \neq \hat{v} \end{cases} \qquad (6)$$

$$\ell_{SE} := V \times \hat{V} \to [0, \infty) \text{ such that } \ell_{SE}(v, \hat{v}) := (v - \hat{v})^2 \qquad (7)$$

respectively. The next step in the complete characterization of the accuracy measure in (5) with loss function choices of either (6) or (7) is the characterization of the corresponding minima on the right side of (5) with these choices, which is explained next.

First, it is well known that for the loss function in (6), the optimal estimator is the maximum a posteriori probability (MAP) estimator, defined as:

$$\hat{V}_{MAP}(z) = \arg\max_{v \in V} P_{V|Z}(v|z) \qquad (8)$$

where $P_{V|Z}$, i.e., conditional distribution of $V$ given $Z$, is defined according to Bayes' rule:

$$P_{V|Z}(v \mid z) := \frac{P_V(v) P_{Z|V}(z \mid v)}{P_Z(z)} \qquad (9)$$

and the ties in (8) are broken uniformly at random, i.e., if the maximizer in (8) is unique, then it is declared as the outcome of the estimator; else, one of the maximizers is chosen uniformly at random and declared as the outcome of the estimator. This randomization in the presence of multiple maximizers is fairly standard in MAP estimation theory, since any optimizer of (8) is exactly as good as any other optimizer in terms of minimizing the cost function in (6). It will be evident to those skilled in the art that the average correct decision probability of the MAP rule, which will be denoted by $\Gamma_{MAP}(P_V, P_{V|Y}, P_{Z|Y})$ henceforth, can be written as follows:

$$\Gamma_{MAP}(P_V, P_{Y|V}, P_{Z|Y}) := \sum_{v,z} P_V(v) P_{Z|V}(z \mid v) \mathbf{1}\{v = \hat{V}_{MAP}(z)\} \qquad (10)$$

$$= \sum_z \max_{v \in V} \{P_V(v) P_{Z|V}(z \mid v)\} \qquad (11)$$

where $\mathbf{1}\{\bullet\}$ is the standard indicator function. Equation (11), along with the choice of $c=1$ in (5), gives the following accuracy measure:

$$f_{acc,MAP}(P_V, P_{Y|V}, P_{Z|Y}) := \Gamma_{MAP}(P_V, P_{Y|V}, P_{Z|Y}) \qquad (12)$$

Secondly, it is well known that for the loss function in (7), the optimal estimator is the conditional mean, i.e., $$\hat{V}_{MSE}(Z) := E[V|Z=z] \qquad (13)$$

with the corresponding minimum mean-square error (MMSE):

$$\mathbb{E}[\text{Var}[V \mid Z]] := \sum_{v,z} P_V(v) P_{Z|V}(z \mid v)(v - \mathbb{E}[V \mid Z = z])^2 \qquad (13.a)$$

where Var$[V|Z]$ denotes the conditional variance of $V$ given $Z$. Hence, picking $c=0$ in (5) gives the following accuracy measure:

$$f_{acc,MSE}(P_V, P_{Y|V}, P_{Z|Y}) := -E[\text{Var}[V|Z]] \qquad (14)$$

Equations (12) and (14) complete the characterization of (5) for the loss functions given in (6) and (7).

Statistical Measures of Privacy.

In general, it is not a straightforward task to quantify an abstract notion like privacy. Nevertheless, one can gain some insight by recalling the extremes of privacy preferences in the framework where $r_o=1$ and $r_o=0$. Specifically, $r_o=1$, which means that user is indifferent about privacy loss, implies that user allows the possibility of the following scenario: Y and Z convey equal amount of information about V. Conversely, $r_o=0$, which means that user does not want any privacy loss, necessitates the following: V and Z are statistically independent, because otherwise one cannot guarantee that knowledge of Z provides no additional information compared with the prior knowledge about V. In light of these observations, decreasing the information content of Z about V compared to the information content of Y about V is a way of reducing the privacy loss user experiences. Alternatively, the amount of statistical dependence of V and Z compared to the amount of statistical dependence of V and Y can be an indicator of the amount of privacy loss user experiences. Thus, we have the following two broad avenues to formalize a statistical measure of privacy: (1) information Z conveys about V compared to information Y conveys about V; and (2) the amount of statistical dependence between V and Z compared to the amount of statistical dependence between V and Y.

In order to proceed with the first alternative above, one needs to choose a measure of information one random variable conveys about another random variable, i.e., information measure. Among many information measures in the literature, Rényi information is noteworthy thanks to its generality and operational significance in various practical settings. Specifically, for any $\lambda > 1$ and pair of random variables (V, Y) with joint distribution $P_{VY}$, Rényi information of order $\lambda$ between V and Y, denoted by $I_\lambda(V; Y)$, is defined as follows:

$$I_\lambda(V;Y) := \frac{\lambda}{\lambda-1} \log \sum_y \left( \sum_v P_V(v) P_{Y|V}^\lambda(y|v) \right)^{\frac{1}{\lambda}} \quad (15)$$

It is well known that $I_\lambda(V; Y)$ is increasing in A, and also satisfies:

$$\lim_{\lambda \to 1} I_\lambda(V;Y) = I(V;Y) \quad (16)$$

where the right side is the well-known mutual information, which is arguably the most relevant information measure from a practical perspective, defined as:

$$I(V;Y) := \sum_{v,y} P_{VY}(v,y) \log \frac{P_{VY}(v,y)}{P_V(v)P_Y(y)} \quad (17)$$

with $P_Y$ denoting the marginal distribution of Y. Thus, (16) ensures that Rényi information recovers mutual information as a limiting case. Further, Rényi information also satisfies the data processing inequality, i.e., $$I_\lambda(V;Z) \le I_\lambda(V;Y) \quad (18)$$

which, in turn, aides us to put forward the following measure of privacy:

$$f_{priv,inf}(P_V, P_{Y|V}, P_{Z|Y}) := \frac{I_\lambda(V;Z)}{I_\lambda(V;Y)} \in [0, 1] \quad (19)$$

where the last assertion follows from (18) and the non-negativity of (15).

A classical way of measuring statistical dependence is to quantify the "distance" between joint distributions of random variables to the product of their marginal distributions, which would have been the joint distribution if they were independent. Divergences provide such a tool that also has an operational meaning in terms of various statistical inference methods. A broad family of divergences is the $f$-divergence. In particular, for a given convex function $f$ such that $f(0)=1$, $f$-divergence between $P_{VY}$ and $P_V P_Y$ is defined as follows:

$$D_f(P_{VY} \| P_V P_Y) := \sum_{v,y} P_V(v) P_Y(y) f\left( \frac{P_{VY}(v,y)}{P_V(v) P_Y(y)} \right) \quad (20)$$

Various well-known divergences, such as relative entropy, chi-squared divergence, Hellinger divergence, Rényi divergence, and so on, can be shown to be an $f$-divergence for some convex function $f$. Further, $$D_f(P_{VY} \| P_V P_Y) \ge 0 \quad (21)$$

with equality if and only if V and Y are independent, and it also satisfies the data processing inequality, i.e., $$D_f(P_{VY} \| P_V P_Y) \le D_f(P_{VY} \| P_V P_Y) \quad (22)$$

which, in turn, aides us to put forward the following measure of privacy:

$$f_{priv,div}(P_V, P_{Y|V}, P_{Z|Y}) := \frac{D_f(P_{VZ} \| P_V P_Z)}{D_f(P_{VY} \| P_V P_Y)} \in [0, 1] \quad (23)$$

where the last assertion follows from (21) and (22).

Analysis.

The choices for measuring the accuracy and privacy give a special structure to the constrained optimization problem in (2), which, in turn, employed to devise an efficient method to compute the optimum value and an optimizer in (2).

Theorem 1.

Particularization of (2) with:

$$f_{acc} \leftarrow f_{acc,\ acc\text{-}meas} \quad (35)$$

$$f_{priv} \leftarrow f_{priv,\ priv\text{-}meas} \quad (36)$$

where priv-meas $\in$ {inf, div} and acc-meas $\in$ {MAP, MSE} is a convex maximization problem over a convex set.

Proof.

We prove that with the aforementioned choices, the feasible set as well as the cost function is convex and begin with the feasible set, i.e., privacy measure. For notational convenience, let:

$$S(P_V, P_{Y|V}, \lambda, r_o) := \left\{ P_{Z|Y} \in \mathcal{P}(\mathcal{Z}|\mathcal{Y}) : \frac{I_\lambda(V;Z)}{I_\lambda(V;Y)} \le r_o \right\} \quad (24)$$

$$S(P_V, P_{Y|V}, f, r_o) := \left\{ P_{Z|Y} \in \mathcal{P}(\mathcal{Z}|\mathcal{Y}) : \frac{D_f(P_{VZ} \| P_V P_Z)}{D_f(P_{VY} \| P_V P_Y)} \le r_o \right\} \quad (25)$$

where $\lambda > 1$, $f$ is a convex function with $f(0)=1$, and $r_o \in [0, 1]$.

Lemma 1.

$S(P_V, P_{Y|V}, \lambda, r_o)$ is a convex set, i.e., $$\alpha P_{Z|Y} + (1-\alpha) Q_{Z|Y} \in S(P_V, P_{Y|V}, \lambda, r_o) \quad (26)$$

for any $P_{Z|Y}, Q_{Z|Y} \in S(P_V, P_{Y|V}, \lambda, r_o)$ and $\alpha \in (0,1)$.

Proof.

First, the condition that $P_{Z|Y} \in p(z|y)$ induces a set of linear equality constraints and the Rényi information ratio term induces a non-linear inequality constraint. In order to represent the non-linear constraint in a more convenient way, define the following function for a given $P_A$, $P_{B|A}$ pair and $\lambda > 1$:

$$\mathcal{F}_o(P_A, P_{B|A}, \lambda) := \sum_b \left( \sum_a P_A(a) P_{B|A}^\lambda(b|a) \right)^{\frac{1}{\lambda}} \quad (27)$$

Equations (15) and (27) imply that:

$$I_\lambda(V; Y) = \frac{\lambda}{\lambda - 1} \log \mathcal{F}_{Oo}(P_A, P_{B|A}, \lambda) \qquad (28)$$

which, along with the monotonicity of log(•), implies that:

$$\left[\frac{I_\lambda(V;Z)}{I_\lambda(V;Y)} \leq r_o\right] \qquad (29)$$

$$\Leftrightarrow \left[\mathcal{F}_o(P_V, P_{Y|V}, P_{Z|Y}, \lambda) \leq \exp(r_o \log \mathcal{F}_o(P_V, P_{Y|V}, \lambda))\right]$$

Hence, in order to conclude the proof, it suffices to prove that $F_o(P_V, P_{Y|V}, P_{Z|Y}, \lambda)$ is a convex function of $P_{Z|Y}$. Note that if we define the conditional distribution of Z given V, i.e., $P_{Z|V}$, as:

$$P_{Z|Y}(z|v) := \sum_y P_{Y|V}(y|v) P_{Z|Y}(z|y) \qquad (30)$$

then, it is easy for those skilled in the art to verify that as a function of $P_{Z|V}$, $$F_o(P_V, P_{Z|V}, \lambda) = F_o(P_V, P_{Y|V}, P_{Z|Y}, \lambda) \qquad (31)$$

is convex. Further, if one views $P_{Y|V}$ and $P_{Z|Y}$ as stochastic matrices, i.e., each row containing $P_{Y|V}(\cdot|v)$ and $P_{Z|Y}(\cdot|y)$, which are probability distributions on y and z, respectively, then (30) can be written as a standard matrix multiplication, i.e., $$P_{Z|V} = P_{Y|V} P_{Z|Y} \qquad (32)$$

One can conclude the proof by capitalizing on the linearity of the right side of (32), along with the aforementioned convexity of $F_o(P_V, \ldots, \lambda)$. QED Lemma 2.
$S(P_V, P_{Y|V}, f, r_o)$ is a convex set, i.e., $$\alpha P_{Z|Y} + (1-\alpha) Q_{Z|Y} \in S(P_V, P_{Y|V}, f, r_o) \qquad (33)$$

for any $P_{Z|Y}, Q_{Z|Y} \in S(P_V, P_{Y|V}, f, r_o)$ and $\alpha \in (0,1)$.

Proof.
The proof follows via arguments similar to Lemma 1, by replacing the convexity of the function defined in (27) with the convexity of $D_f(P_{VZ}\|P_V P_Z)$ as a function of $P_{Z|V}$, which is an easy consequence of the facts that $D_f(\cdot\|\cdot)$ is jointly convex in its arguments, and the linearity of the operations in (32) and the marginalization of a joint distribution. QED Lemma 3. $f_{acc,MAP}(P_V, P_{V|V}, \cdot)$ is a convex function over noisy channels from y to Z.

Proof.
One can write $\Gamma_{MAP}(P_V, P_{Y|V}, P_{Z|Y})$ as follows:

$$\Gamma_{MAP}(P_V, P_{Y|V}, P_{Z|Y}) = \sum_z \max_{v \in V} \left\{ P_V(v) \sum_y P_{Y|V}(y|v) P_{Z|Y}(z|y) \right\} \qquad (34)$$

In light of (34), one can conclude the proof by recalling the facts that the sum of convex functions is also a convex function and the maximum of the sum of two functions is smaller than the sum of the individual maxima of the functions. QED Lemma 4.
$f_{acc,MSE}(P_V, P_{Y|V}, \cdot)$ is a convex function over noisy channels from y to z.

Figure 4:
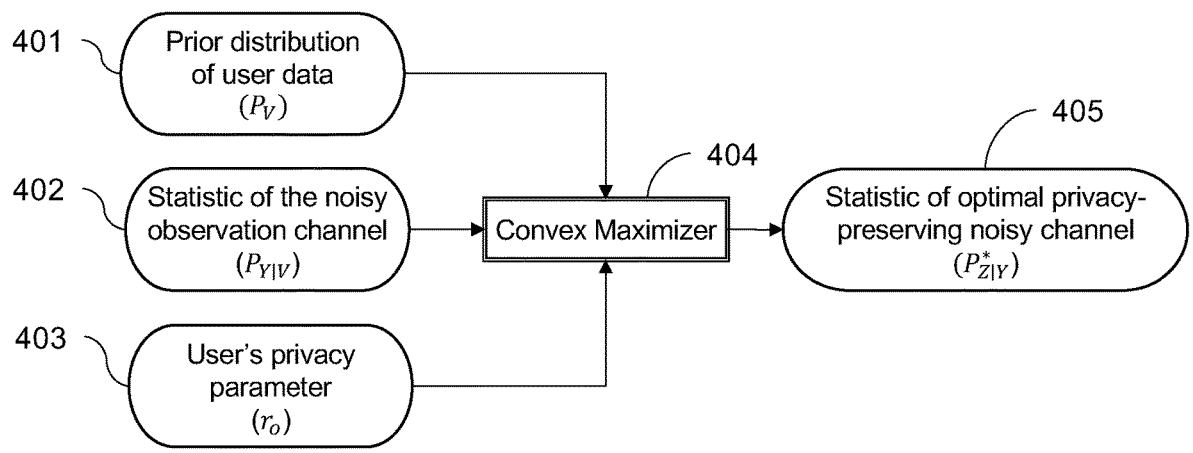
FIG. 4 depicts a high-level block diagram for the implementation of a method to choose the optimal design variable in the model outlined in FIG. 3.

Proof.
It is easy to show that $-E[\text{Var}[V|Z]]$ is convex as a function of the joint distribution $P_{VZ}$. This, along with the linearity of the operation in (32), allows us to conclude the proof. QED Lemmas 1-4 imply Theorem 1. QED Equipped with Theorem 1, a high-level description of a system to compute the statistics of an optimal privacy-preserving noisy channel is given in FIG. 4. Specifically, the system, i.e., convex maximizer 404, takes three inputs: prior distribution of user data 401, statistic of the noisy observation channel 402, and user's privacy preference 403. It computes the optimizer in (2) and outputs the statistics of an optimal privacy-preserving noisy channel 405.

Computation of the Optimal Privacy-Preserving Noisy Channel.

All the maximizer(s) of a convex function over a convex set occur(s) at the extreme points of the feasible set. Thus, finding a global maximizer of a convex function over a convex set typically necessitates evaluating the value of the cost function for all extreme points, which, in turn, makes it computationally demanding. Further, when the feasible convex set is not a polyhedron (a polyhedron is a convex set defined by the intersection of a finite number of half-spaces, a bounded polyhedron is called a convex polytope or simply polytope), then its extreme points may form a continuum, i.e., cardinality of the set of extreme points of the feasible set is uncountable infinity, it becomes extremely difficult to devise an algorithm that computes the global maximum exactly infinite time. Thus, it is customary to devise iterative methods that will compute upper and lower bounds on this value that are approaching each other in every iteration. Although one such methodology, in the spirit of the outer approximations in convex maximization literature, can be directly applied to implement the system 404, it is possible to get a significant performance improvement by exploiting the particular properties of the problem in (2) beyond its convexity.

Method for Computing Optimal Privacy Preserving Noisy Channel.

Figure 5:
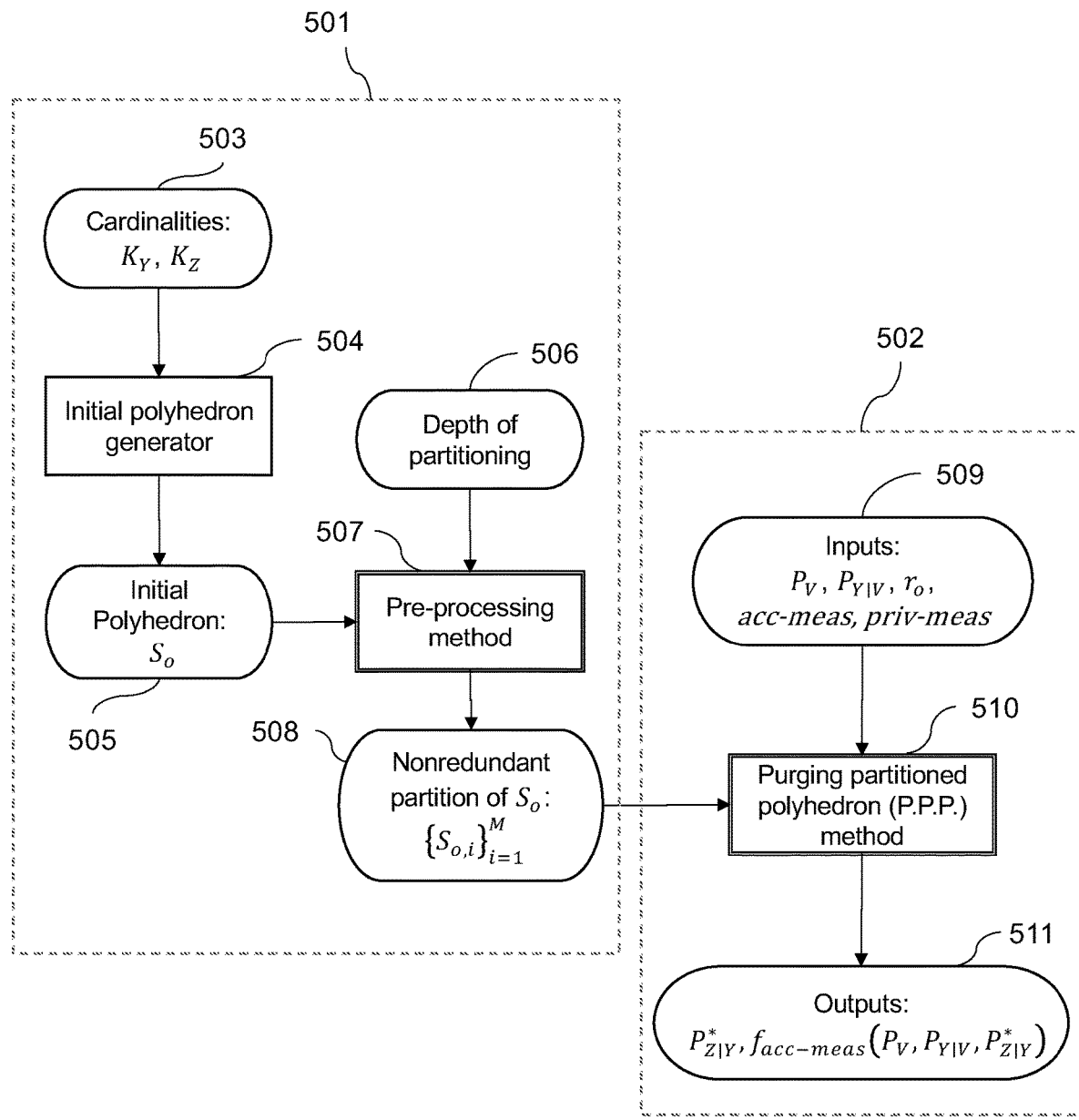
FIG. 5 shows the flowchart of a method to compute the optimal privacy-preserving noisy channel for the provided system parameters.

FIG. 5 depicts a method for computing an approximation of the optimum value of the optimization problem in (2) and a channel achieving this value. It includes an offline method 501 and an online method 502. The main difference between the offline and online methods is that inputs of the online method include instance specific parameters, such as $P_V$, i.e., prior distribution of user information, $P_{Y|V}$, i.e., statistics of the noisy observation channel, $r_o$, i.e., user's privacy preference; thus it needs to be computed every time any of these parameters changes. On the other hand, only instance specific inputs of the offline method are the cardinalities of the input and output alphabets of the privacy-preserving noisy channels, which does not change as frequent as the aforementioned inputs of the online method in typical embodiments of the model depicted in FIG. 3. As such, one can use the output of the offline method as long as cardinalities of the input and output alphabets of the privacy-preserving noisy channels stay the same.

Offline method consists of two sub-methods, initial polyhedron generator 504 and the pre-processing method 507. Pre-processing method, which will be explained separately in a following section, has two inputs, depth of partitioning 506 and initial polyhedron 505. Initial polyhedron 505, denoted by $S_o$, is generated by the method 504 whose only input 503 is the pair ($K_Y$, $K_Z$), i.e., cardinalities of the input and output alphabets of the privacy-preserving noisy channels. Output of the offline method is a non-redundant partition of the initial polyhedron 508.

Main operation of the online method is carried out by 510, i.e., purging partitioned polyhedron (P.P.P.) method, which will be explained separately in a following section. P.P.P. method has two inputs, a non-redundant partition of the initial polyhedron 508 and a 5-tuple of parameters 509, which includes $P_V$, i.e., prior distribution of user information, $P_{Y|V}$, i.e., statistics of the noisy observation channel, $r_o$, i.e., user's privacy preference, acc-meas $\in$ {MAP, MSE}, i.e., accuracy measure choice, priv-meas $\in$ {inf, div}, i.e., privacy measure choice. The output of the online method 511, which is also the output of the overall method, consists of an approximation of the optimum value of the optimization problem in (2) and a channel achieving this value.

Unlike the pre-processing method 507 and the P.P.P. method 510, the operation of the initial polyhedron generating method 504 will be evident to those skilled in the art and it is explained for the sake of completeness. To this end, first define the following mapping from a given stochastic matrix of size $K_Y \times K_Z$ to an $K_Y K_Z$-length vector:

$$\bar{x}(P_{Z|Y}) := [P_{Z|Y}(\cdot|1), P_{Z|Y}(\cdot|2), \ldots, P_{Z|Y}(\cdot|K_Y)] \quad (37)$$

where $P_{Z|Y}(\cdot|1)$ is a probability distribution on z, corresponding to the transition probability when the input to the channel is $i \in \{1, \ldots, K_Y\}$. Let $P_{Z|Y}(\vec{x})$ denote its inverse mapping from a given $K_Y K_Z$-length vector to a matrix of size $K_Y \times K_Z$. The fact that $P_{Z|Y}$ is a transition probability matrix can be captured by imposing the following linear constraints on $\bar{x}(P_{Z|Y})$:

$$\vec{x}(P_{Z|Y})_i \geq 0, \forall i \{1, \ldots, K_Y K_Z\} \quad (38)$$

$$\sum_{j=1}^{K_Z} \vec{x}(P_{Z|Y})_{K_Z(i-1)+j} = 1, \forall i \{1, \ldots, K_Y\} \quad (39)$$

where the subscript i denotes the i-th element of a vector. Equations (38) and (39) suffice to characterize the linear constraints of the feasible set. Let $A_o$ denote the matrix that succinctly summarizes (38) and (39). In particular, let:

$$S_o' := \{x : A_o \vec{x} \leq \vec{b}_o\} \quad (40)$$

denote the polyhedron corresponding to (38) and (39). Here, $\vec{b}_o$ represents the vector that collects the right sides of (38) and (39), inequality means all the elements of the vectors satisfy the inequality and we convert the equality constraints in (39) by the usual methodology exemplified below:

$$[a=b] \Leftrightarrow [a \geq b \text{ and } -a \geq -b] \quad (41)$$

for any a, b$\in$R. Finally, note that:

$$S_o = \{\vec{x}(P_{Z|Y}) : P_{Z|Y} \in p(z|y)\} \quad (42)$$

which is 505 in FIG. 5, is the set of all stochastic mappings from y to z in vectorized form, in the sense of (37).

Pre-Processing Method.

Figure 6:
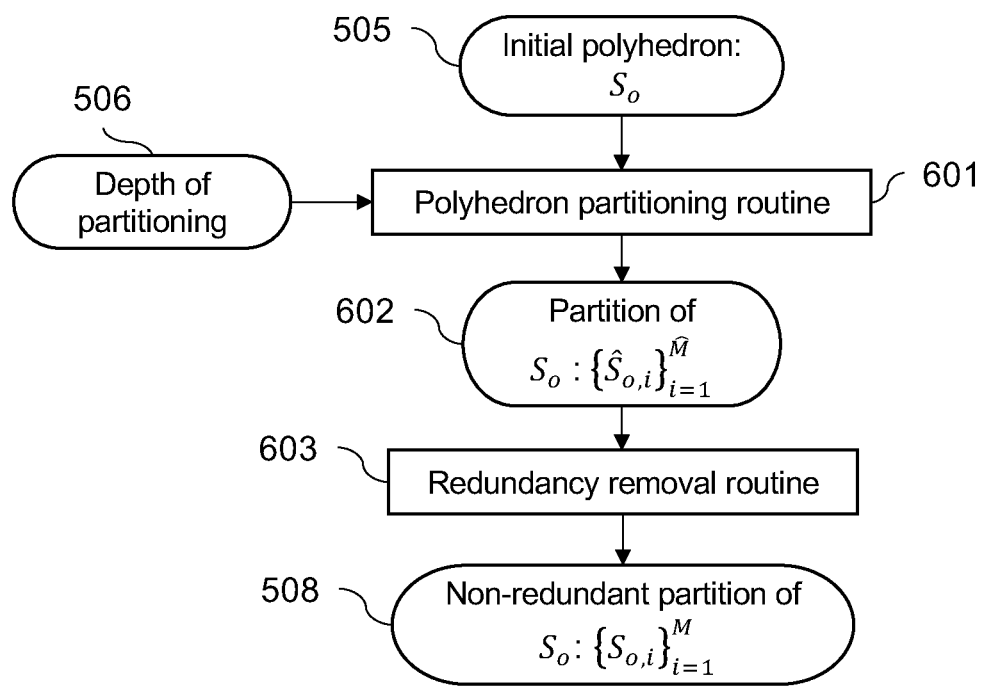
FIG. 6 is a block diagram of the pre-processing method used in the method to compute the optimal privacy-preserving noisy channel, given in FIG. 5.

Pre-processing method 507, which is depicted in FIG. 6, consists of two main steps, polyhedron partitioning routine 601 and redundancy removal routine 603. Method admits two inputs, initial polyhedron 505 and the depth of partitioning 506, which determines how many layers the partitioning operation is applied. The redundancy removal routine 603 is applied to the output of the partitioning operation 601 to deduce the output of the pre-processing method 507.

It is important to note that the redundancy removal routine 603 explained in this section does not depend on $P_V$, $P_{Y|V}$, $r_o$, acc-meas, priv-meas. As such, it can be computed offline and used for any of the problem instances with the corresponding ($K_Y$, $K_Z$) values.

Polyhedron Partitioning Routine.

Consider an arbitrary but fixed polyhedron $S \subset R^n$. Let $\{F_1, \ldots, F_N\}$ be the facets, i.e., k−1 dimensional faces, of S, and assume that N>2. Further, let $\{V_1, \ldots, V_N\}$ denote the V− representation of the facets, i.e., for each i$\in$ $\{1, \ldots, N\}$, $V_i = \{\vec{v}_{i,1}, \ldots, \vec{v}_{i,M_i}\}$ denotes the vertices of $F_i$, which is a polyhedron by definition. Let $\vec{x}_o$ be the center of mass of S, which can be found as the average of the vertices of S. To be precise, let $V = \{\vec{v}_{o,1}, \ldots, \vec{v}_{o,M_o}\}$ be the V-representation of S. Then, the center of mass, i.e., $\vec{x}_o$, is defined as:

$$\vec{x}_o := \frac{1}{M_o} \sum_{j=1}^{M_o} \vec{v}_{o,j} \quad (59)$$

For every i$\in$ $\{1, \ldots, N\}$, define the polyhedron:

$$S_{o,i} := \text{conv}(V_i \cup \{\vec{x}_o\}) \quad (60)$$

i.e., the convex hull of the points $\{\vec{v}_{i,1}, \ldots, \vec{v}_{i,M_i}, \vec{x}_o\}$, i.e., the smallest convex set containing the points $\{\vec{v}_{i,1}, \ldots, \vec{v}_{i,M_i}, \vec{x}_o\}$. It will be evident to those skilled in the art that the aforementioned points form a V-representation of the said polyhedron. Further, by construction, $\cup_{i=1}^{N} S_i = S$ and the polyhedra intersect only through their facets, i.e., their relative interiors are disjoint.

One can use this procedure in the polyhedron partitioning routine 601 as many times specified by the depth of partitioning 506, by forming a tree of polyhedra, where at each step each initial polyhedra is partitioned by the aforementioned procedure to form the nodes of the next step, and the root of the tree is $S_o$, i.e., 505. The aforementioned steps will result in a partitioning of the initial polyhedron $S_o$, i.e., 602.

Redundancy Removal Routine.

Consider above partitioning scheme with $S \leftarrow S_o$ where $S_o$ is given in (42). Based on the descriptions provided herein, it will be evident to those skilled in the art that it is possible to determine an H-representation of the facets of $S_o$ by imposing each inequality constraint as an equality constraint sequentially, since H-representation of $S_o$ is in non-redundant form. Further, the center of mass is simply $$\vec{x}_o = \frac{1}{K_z} \vec{1} \in R^{K_Y K_Z},$$

where $\vec{1}$ denotes the vector of 1s. Hence, applying the procedure in Section 3.2.1 results in the set of sub-polyhedra:

$$\{S_{o,1}, \ldots, S_{o,K_Y K_Z}\} \quad (61)$$

since there are $K_Y K_Z$ inequality constraints in H-representation of $S_o$.

One can apply the same procedure to every $S_{o,i}$ to further partition the original set. However, as is argued below, some of the polyhedra in (61) might be "column permutations of each other", a notion whose precise definition is given below, which, in turn, makes them redundant. Thus, filtering out these redundant sub-polyhedra as a starting point of the next level of partitioning significantly improves performance without resulting in a loss of optimality.

Consider two arbitrary elements $S_{o,i}$, $S_{o,j}$ of the set of polyhedra in (61).
Define:

$$V_{o,i} = \{\vec{v}_{o,i,1}, \ldots, \vec{v}_{o,i,M_i}\} \quad (62)$$

$$V_{o,j} = \{\vec{v}_{o,j,1}, \ldots, \vec{v}_{o,j,M_j}\} \quad (63)$$

denote V-representations of $S_{o,i}$ and $S_{o,j}$, respectively. If:
(i) $|V_{o,i}| = |V_{o,j}|$
(ii) For all $k \in \{1, \ldots, M_i\}$, $$P_{Z|Y}(\vec{v}_{o,i,k}) = P_{Z|Y}(\vec{v}_{o,i,k}) Q_P \quad (64)$$

for an arbitrary but fixed permutation matrix $Q_P \in \mathbb{R}^{K_Z \times K_Z}$, then $S_{o,i}$ and $S_{o,j}$ are equivalent as far as the optimization problem in (2) goes, since for any $\vec{x} \in S_{o,i}$ (resp. $\vec{y} \in S_{o,j}$), there exists some $\vec{y} \in S_{o,j}$ (resp. $\vec{x} \in S_{o,i}$), with exactly the same cost and constraint function values, whose proof follows from routine calculations that can be carried out by those skilled in the art.

Thus, one can define an equivalence class of sub-polyhedra in terms of the property defined by the conditions in items (i) and (ii) above. In each equivalence class, it is sufficient to keep only one representative for either further partitioning or evaluating the optimum value.

Purging Partitioned Polyhedral (P.P.P.) Method.

Figure 7:
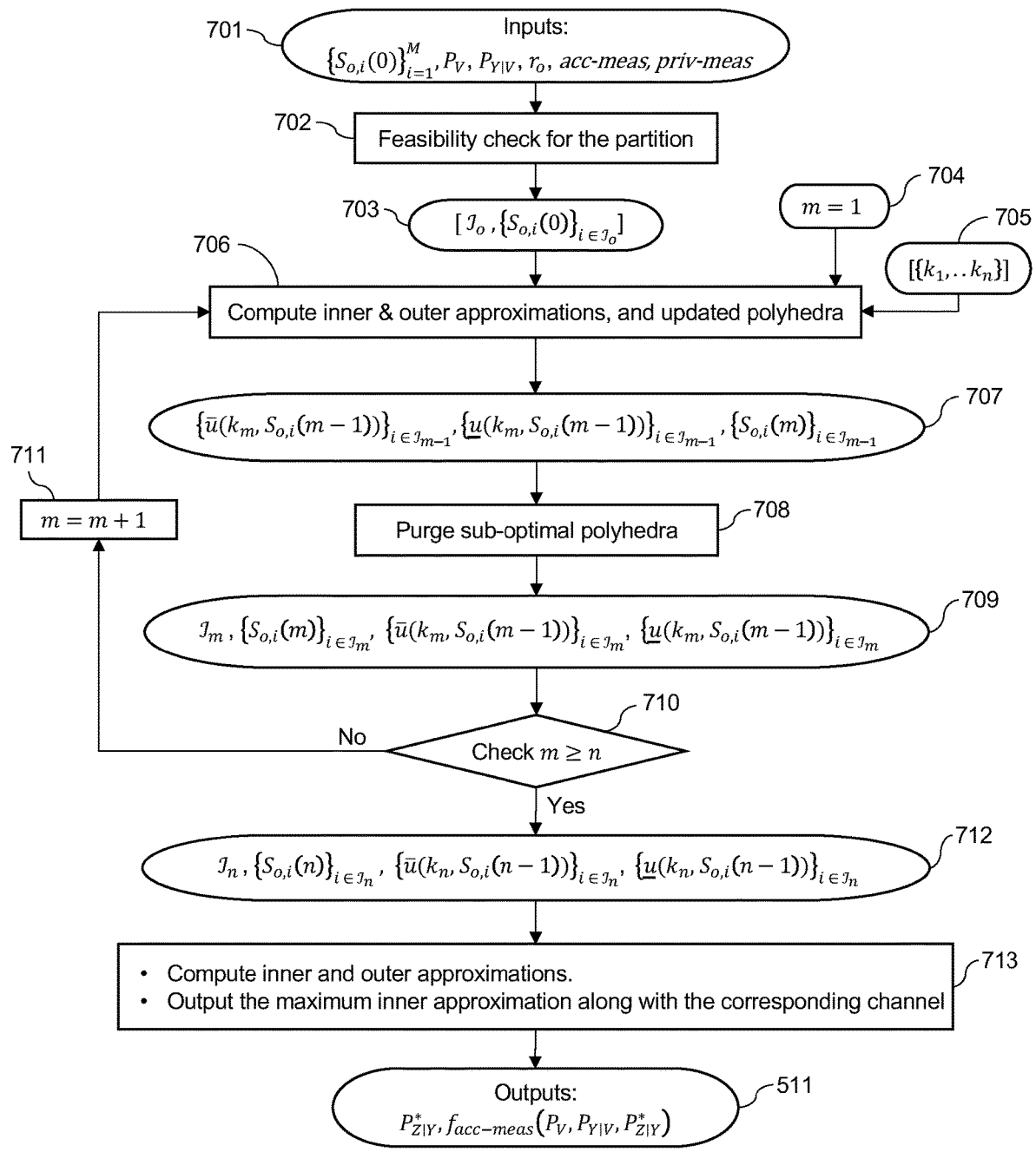
FIG. 7 is a block diagram of the purging partitioned polyhedron method used in the method to compute the optimal privacy-preserving noisy channel, given in FIG. 5.

FIG. 7 depicts the purging partitioned polyhedra (P.P.P.) method. The method uses two main subroutines, namely feasibility check via alternating projections and simple approximation. The list of inputs 701 of the method consists of the non-redundant partition of the initial polyhedron, which is the output of the pre-processing method, as well as the parameters of the particular problem instances, i.e., the 5-tuple. As the first step of its operation 702, the method checks for the feasibility of each polyhedron of the provided non-redundant partition by the alternating projection method and eliminate infeasible polyhedra. Thus, input of the next step 703 consists of the feasible polyhedra and their corresponding indices, denoted by $\{S_{o,i}(0)\}_{i \in J_o}$ and $\mathcal{J}_o$, respectively.

Before proceeding further, define the following quantities: For any given polyhedron $S \subset S_o$ such that its intersection with the feasible set, i.e., $$S_{priv-meas}(P_V, P_{Y|V}, r_o) := \quad (67)$$
$$\{\vec{x}(P_{Z|Y}) : P_{Z|Y} \in \mathcal{P}(\mathcal{Z}|\mathcal{Y}), f_{priv,priv-meas}(P_V, P_{Y|V}, P_{Z|Y}) \leq r_o\}$$

is not empty, $\bar{u}(k,S)$ and $\underline{u}(k, S)$ denote the outer and inner approximation values of the optimization problem:

$$\sup_{\vec{x} \in S: f_{priv,priv-meas}(P_V, P_{Y|V}, P_{Z|Y}(\vec{x})) \leq r_0} f_{acc,acc-meas}(P_V, P_{Y|V}, P_{Z|Y}(\vec{x})) \quad (70)$$

with k maximum iterations computed by the simple approximation routine, which is explained in Section 3.2.3.2.

Returning back to the description, following steps are repeated n times, where $\mathcal{J}_{m-1}$ denotes the indices of the sub-polyhedra at the beginning of step m, m=1, i.e., 704, is the initial value for the iteration counter, $\{k_1, \ldots k_n\}$, i.e.,

705, determines the max-iter for simple inner approximation for each step, as well as the total number of times the following steps are repeated, i.e., n:

1. For every $i \in \mathcal{J}_{m-1}$, compute $\bar{u}(k_m, S_{o,i}(m-1))$, $\underline{u}(k_m, S_{o,i}(m-1))$, and the updated polyhedron $S_{o,i}(m)$ via simple approximation procedure, i.e., perform the operation 706, and output these quantities, i.e., 707.
2. Eliminate all sub-optimal polyhedra 708 with $$\bar{u}(k_m, S_{o,i}(m-1)) < \max_{j \in \mathcal{J}_{m-1}} \underline{u}(k_m, S_{o,j}(m-1)),$$

since they cannot contain a global maximizer. In other words, compute $$\mathcal{J}_m := \{i \in \mathcal{J}_{m-1} : \bar{u}(k_m, S_{o,i}(m-1)) \geq \max_{j \in \mathcal{J}_{m-1}} \underline{u}(k_m, S_{o,j}(m-1))\} \quad (72)$$

and output the following 4-tuple $$\mathcal{J}_m, \{S_{o,j}(m)\}_{i \in \mathcal{J}_m}, \{\bar{u}(k_m, S_{o,i}(m-1))\}_{i \in \mathcal{J}_m}, \{\underline{u}(k_m, S_{o,i}(m-1))\}_{i \in \mathcal{J}_m}$$

for the next iteration, i.e., perform the operation 709.
3. Check whether current iteration m exceeds n+1, i.e., perform 710. If not, increment counter by 1, i.e., perform 711.

Finally, once $\mathcal{J}_n$, $\{S_{o,i}(n)\}_{i \in \mathcal{J}_n}$, $\{\bar{u}(k_n, S_{o,i}(n-1))\}_{i \in \mathcal{J}_n}$, and $\{\underline{u}(k_n, S_{o,i}(n-1))\}_{i \in \mathcal{J}_n}$ are computed 712, next step, i.e., 713, performs the simple approximation routine with maximum iterations $K_{max} - \Sigma_{m=1}^n k_m$ for each $S_{o,i}(n)$, and outputs the maximum of computed inner approximation along with the channel achieving it, i.e., $P_{Z|Y}^*$, $f_{acc-meas}(P_V, P_{Y|V}, P_{Z|Y}^*)$, as the output of the system 511.

The following points regarding practical implementation of the above procedure should be noted. First, applications of the simple approximation routine in 706 and 713 can be carried out in parallel. Thus, computationally most demanding part of the method can be accomplished in a parallelized fashion. Second, in practice, as the granularity of the initial partition increases, the number of cuts needed to get close enough inner and outer approximations in the simple approximation procedure appears to decrease. Hence, computation time for each sub-polyhedra appears to decrease as the granularity of the partition increases.

Feasibility Check Via Alternating Projections.

Consider a set of polyhedra $\{S_{o,i}\}_{i=1}^N$ such that $S_{o,i} \subset S_o$ for all $i \in \{1, \ldots, N\}$. Recall that the feasible set, i.e., $$S_{priv-meas}(P_V, P_{Y|V}, r_o) = \{ \quad (67)$$
$$\vec{x}(P_{Z|Y}) : P_{Z|Y} \in p(z|y), f_{priv,priv-meas}(P_V, P_{Y|V}, P_{Z|Y}) \leq r_o\}$$

is a convex set. Hence, the well-known alternating projection algorithm can be used to decide whether $S_{o,i}$ and $S_{priv-meas}(P_V, P_{Y|V}, r_o)$ are disjoint. Specifically, this algorithm either finds a point in their intersection, if it is not empty, or converges to two points in each set closest to each other, if the intersection is empty.

For completeness, a summary of the alternating projection procedure is given as follows: Start with a point in $S_{priv-meas}(P_V, P_{Y|V}, r_o)$, e.g., xo, i.e., center of mass of $S_o$. At j-th step ($j \geq 1$), compute the following quantities:

$$\vec{y}_j : \text{projection of } \vec{x}_j \text{ onto } S_{o,i} \quad (68)$$

$$\vec{x}_{j+1} : \text{projection of } \vec{y}_j \text{ onto } S_{priv-meas}(P_V, P_{Y|V}, r_o) \quad (69)$$

At each step, if $\vec{x}_{j+1} = \vec{y}_j$ terminate and declare that the intersection is not empty, which, in turn, implies that $S_{o,i}$ is feasible. Continue a maximum number of times (in practice, 5 to 10 iterations appear to suffice) and if $\vec{x}_{j+1} \neq \vec{y}_j$ after the final iteration, declare that the sets are disjoint, which is equivalent to saying $S_{o,i}$ is infeasible.

Simple Approximation Routine.

Recall that $S_{priv-meas}(P_V, P_{Y|V}, r_o)$ is a subset of $S_o$ and the containment is strict unless $r_o=1$. However, since $S_o$ is a polyhedron, it has a finite number of extreme points (equivalently vertices) and there are known algorithms to characterize them, such as Fourier-Motzkin elimination and linear programming-based methods. Thus, if one can "peel-off" $S_o$ by successive cuts so that the maximum of the cost function over the reduced polyhedron strictly improves, i.e., gets lower, one should progress toward a (local) optimum value of the original problem. Depending on the cutting methodology, it is well known to those skilled in the art that outer approximations in the spirit of the above ideas will lead to a global optimum of the original problem.

One such procedure is explained below where $$\text{priv-meas} \in \{\text{inf,div}\} \tag{43}$$

$$\text{acc-meas} \in \{\text{MAP,MSE}\} \tag{44}$$

1. Initialize with $S_o$ and i=0.
2. Repeat the following steps until convergence, where $S_i$ denotes the polyhedron at i-th iteration.
   2.1. Compute i-th outer approximation point:

$$\vec{x}_i^* := \underset{\vec{x} \in S_i}{\arg\max} f_{acc,acc-meas}(P_V, P_{Y|V}, P_{Z|Y}(\vec{x})) \tag{45}$$

2.2. Compute the projection of $\vec{x}_i^*$ onto the feasible set $S_{priv-meas}(P_V, P_{Y|V}, r_o)$, defined in (67), i.e., $$\vec{y}_i := \arg \underset{\vec{x} \in S_{priv-meas}(P_V, P_{Y|V}, r_o)}{\max} \frac{1}{2} \|\vec{x}_i^* - \vec{x}\|_2^2 \tag{47}$$

where $\|.\|_2$ denotes the Euclidean norm.
   2.3. Compute the supporting hyperplane of $S_{priv-meas}$ $(P_V, P_{Y|V}, r_o)$ at $\vec{y}_i$ and update $A_i$ by adding the equation of this hyperplane, i.e., cut $S_i$ with the aforementioned supporting hyperplane, to get $A_{i+1}$ and $\vec{b}_{i+1}$ to deduce:

$$S_{i+1} = \{\vec{x} : A_{i+1}\vec{x} \le \vec{b}_{i+1}\} \tag{48}$$

In what follows, we list some remarks regarding the implementation of the aforementioned routine.

Computing the Maximizer of the Relaxed Problem.

Recall the problem:

$$\underset{\vec{x} \in S_i}{\max} f_{acc,acc-mea}(P_V, P_{Y|V}, P_{Z|Y}(\vec{x})) \tag{49}$$

where $S_i = \{\vec{x} : A_i \vec{x} \le \vec{b}_i\}$, i.e., the polyhedron that includes the feasible set. As we have noted above, any maximizer of this problem is a vertex of $S_i$ and one needs to evaluate the cost function over all these vertices to find the global maximizer. Computing the cost function is not computationally demanding. Although there are well-known numerical routines to compute the vertices of a given polyhedron, such as the double description method based on Fourier-Motzkin elimination and methods based on linear programming, it is computationally more demanding compared with the remaining parts, especially as the number of iterations, i.e., number of cuts, grows beyond a moderate number that depends on the dimensionality of the channels, i.e., $K_V$, $K_Y$, and $K_Z$. As such, efficient implementation necessitates limiting the number of cuts.

Computing the Hyperplane Cuts.

An implementation of the cutting-plane procedure is the following: Given $\vec{y}_i$ on the boundary of the feasible set, a supporting hyperplane can be found by evaluating the gradient of $f_{priv,priv-meas}(P_V, P_{Y|V}, \cdot)$ at this point, which will be the normal vector of the supporting hyperplane. In particular, the half-space defined by this supporting hyperplane is given by:

$$H_i := \{\vec{x} : \langle \nabla f_{priv,priv-meas}(P_V, P_{Y|V}, P_{Z|Y}(\vec{y}_i)), \vec{y}_i - \vec{x} \rangle \ge 0\} \tag{50}$$

where $\nabla$ and $\langle .,. \rangle$ denote the gradient and inner product operators, respectively. One can augment the inequality constraint in (50) into $A_i$ to get the H-representation of the updated polytope $S_{i+1}$ for (i+1)-th step.

Thresholds for Termination.

The routine outlined above can be shown to converge to a global maximizer as the step size grows unboundedly. Yet, for practical applications, one needs to impose some termination conditions. To this end, define the following quantities:

$$C_{outer}(i) := f_{acc,acc-meas}(P_V, P_{Y|V}, P_{Z|Y}(\vec{x}_i^*)) \tag{53}$$

$$C_{inner}(i) := \underset{j \in \{0, \ldots, i\}}{\max} f_{acc,acc-mea}(P_V, P_{Y|V}, P_{Z|Y}(\vec{y}_j)) \tag{54}$$

where $C_{outer}(i)$ (resp. $C_{inner}(i)$ are the outer (resp. inner) approximation values after i iterations, and $C_{outer}(0)$ and $C_{inner}(0)$ are the initial values of these quantities, provided as part of the initial conditions of the routine.

Let $\delta_{outer-app-improv}$, $\delta_{outer-inner-app}$ and $\delta_{const-qual}$ denote the tolerance on the outer approximation improvement, inner-outer approximation distance, and distance to the feasible region, respectively. Also, let max-iter denote the maximum number of iterations allowed.

The iteration is terminated if any of the following four conditions is satisfied:

$$|C_{outer}(i+1) - C_{outer}(i)| \le \delta_{outer-app-improv} \tag{55}$$

$$|C_{outer}(i) - C_{inner}(i)| \le \delta_{outer-inner-app} \tag{56}$$

$$f_{priv,priv-meas}(P_V, P_{Y|V}, P_{Z|Y}(\vec{x}_i^*)) - r_o | \delta_{const-qual} \tag{57}$$

$$i \le \text{max-iter} \tag{58}$$

With these termination conditions, we conclude the remarks regarding the practical implementation of the simple approximation routine.

In conclusion, we would like to reiterate the differences the present system offers compared to conventional systems and give a detailed comparison with the existing work in the literature that are arguably the most relevant to the present system.

The present system offers the following differences as compared to conventional systems. First, in conventional systems, accuracy is based on closeness of Z to Y, measured either in terms of an average distortion measure or an information measure, rather than the accuracy of best statistical inference algorithm's performance of inferring V based on the observation Z as in our case. Second, conventional systems are "dual" to our formulation, i.e., accuracy is guaranteed, privacy is optimized. In our case, it is the other way around. Third, implementation of conventional systems involves a convex minimization over a convex set, rather than a convex maximization over a convex set as in our case. Fourth, in conventional systems, privacy measure is not normalized, as opposed to our case.

Privacy-Preserving Data Mapping Under a Privacy-Utility Trade-Off.

In their paper, entitled "Privacy against statistical inference," in 50th Annual Allerton Conference on Communication, Control, and Computing, Monticello, ILL, 2012., F. du Pin Calmon and N. Fawaz consider the following setting, which is reproduced here in the notation we have used above:

Given $V \leftrightarrow Y \leftrightarrow Z$ $$\text{minimize } c_o^* - \mathbb{E}[c_Z^* | Z], \text{ subject to } \mathbb{E}[d(Y, Z)] \leq \Delta \quad (59)$$

$$\text{minimize } c_o^* - \min_z c_Z^*, \text{ subject to } \mathbb{E}[d(Y, Z)] \leq \Delta \quad (60)$$

where $$c_o^* := \min_{Q_V} \mathbb{E}[C(V, Q_V)]$$

and $C(V, Q_V)$ is a loss function from the cartesian product of V and the probability distributions defined on it to real numbers, d: y×z→$R_+$ is a distortion measure and $$c_Z^* := \min_{Q_V} \mathbb{E}[C(V, Q_V) | Z = z].$$

The optimization variable of the minimization problems in (59) and (60) are stochastic mappings from Y to Z, i.e., $P_{Z|Y}$. Note that the above formulation has been shown to be stronger than differential privacy, hence in a sense a generalization of differential privacy. It will be evident to those skilled in the art that the aforementioned setting is fundamentally different than the privacy-preserving sufficient statistic. The following is a list some of the most notable differences. First, accuracy in the aforementioned formulation is based on the closeness of Z to Y, measured in terms of an average distortion measure; whereas the accuracy of an optimal statistical inference algorithm's, for a given loss function, inference of V based on the observation Z, in privacy-preserving sufficient statistic. Second, aforementioned formulation is "dual" of the formulation of privacy-preserving sufficient statistic, i.e., in the former the accuracy of third party's observation is guaranteed to exceed a certain amount and the privacy loss of the user is minimized; whereas in the latter, the privacy-loss user experience is guaranteed not to exceed a certain amount and the accuracy of third party's inference is maximized. Third, the particularization of the aforementioned formulation with the self-information cost function, reduces to a convex minimization over a convex set; whereas the particularizations of the privacy-preserving sufficient statistic with the privacy and accuracy measures mentioned above reduces to a convex maximization over a convex set. It will be evident to those skilled in the art that these two types of optimization problems are fundamentally different as far as the methods to compute their respective optimizers. Fourth, in the aforementioned formulation, privacy measure is not normalized, whereas in privacy-preserving sufficient statistic privacy measure is normalized.

Information Bottleneck/Privacy Funnel.

The so-called information bottleneck, introduced by N. Tishby and his co-workers in their paper "The information bottleneck method," arXiv:physics/0004057, 2000, and its dual privacyfunnel, introduced by A. Makhdoumi and his co-workers in their paper "From the information bottleneck to the privacy funnel," in 2014 IEEE Information Theory Workshop (ITW 2014), 2014, are two noteworthy attempts to formalize privacy-utility trade-off, the entirety of each is incorporated herein by reference in their entirety. In our notation, they read as follows:

Given $V \leftrightarrow Y \leftrightarrow Z$ and $\lambda > 0$ $$\max_{P_{Z|Y}: I(Y;Z) \leq x} I(V; Z) \text{ or } \max_{P_{Z|Y}} [I(V; Z) - \lambda I(Y; Z)] \quad (61)$$

$$\min_{P_{Z|Y}: I(Y;Z) \geq x} I(V; Z) \text{ or } \min_{P_{Z|Y}} [I(V; Z) - \lambda I(Y; Z)] \quad (62)$$

where (61) (resp. (62)) called as information bottleneck (resp. privacyfunnel). Note that in both cases, the second optimization problem is typically interpreted as a Lagrange multiplier version of the first one, claimed to be an equivalent formulation. There are also f-divergence versions, to which the following comments also apply. Among many differences with the formulation presented herein, the most notable ones follow. First, privacy is measured in terms of the information Z contains about Y, yet in our case we use a normalized version of the information Z contains about the user preference V. Second, accuracy is measured in terms of the mutual information, i.e., an information measure, whereas in our case we use the accuracy of best statistical inference algorithm's performance in inferring V based on the observation Z and these two notions don't have a direct mapping between each other. Third, for the constrained versions, algorithms given only to compute the boundary of the set $\{[I(Y; Z), I(V; Z): V \leftrightarrow Y \leftrightarrow Z\}$, which does not give an optimizer but rather provides, in a sense, a subset of the feasible set that includes the global optimizer(s), whereas we have an algorithm that computes a global optimizer.

An Example of the Implementation of Valuable Information Extractor, i.e., 102, and Clarification on the Role of Updated Prior Information.

Consider the following scenario: valuable information is a rating of a user's likelihood of purchasing a product at a given time instance. A particular example can be constructed akin to stock ratings in which an analyst summarizes her belief of a stock's future potential in discretized options such as buy, hold, sell. Specifically, the aforementioned rating of a user's likelihood of purchasing a product at a given time instance can consist of three possible values: (i) Interested; (ii) Neutral; and (iii) Not interested.

In order to extract this valuable information, the method can use the totality of a user's web activity, such as websites visited, search queries, shopping charts in e-commerce websites, etc., which represents the meta data source in the above discussion. In any practical embodiment of the aforementioned scenario, it should be clear that the valuable information is not readily available to the method and needs to be extracted from the meta data source. Next, we outline one way to implement the method in such a scenario and outline the role of prior knowledge plays in this implementation.

Let $\{X_1, \ldots, X_T\}$ be a sequence of the rating of user's likelihood of purchasing a given product, where $X_i$ is the said rating at time i and assume the method's ultimate goal is to extract an estimate of $X_T$, i.e., the said rating at time T. One way to achieve this in a dynamical manner is to extract estimates of $X_i$ at each time instance, i.e., iteratively refine the estimate of the rating in light of further information gathered at each time. Let $\{Y_1, \ldots, Y_T\}$ represent the sequence of such iterative estimates. At the beginning of the procedure, i.e., the operation to produce $Y_1$, the method would use all the prior knowledge about the aforementioned rating, along with all the available meta data at that point in time.

One can succinctly summarize this prior knowledge with a probability distribution over the possible values this rating can take. For example, going back to the initial example, if no prior information was available, then one could simply assume that all the three possibilities are equally likely, i.e., all the possibilities has a probability of ⅓. After the extraction operation at each time i, the method has a potentially updated information, which is not only due to the availability of more meta data, but also due to the fact that the extraction operation distills more refined information regarding $X_i$. As such, in order to accomplish the extraction during the next time instance, the prior knowledge to be used will be different and hence, needs to be updated. In particular, for the ultimate step, in which $Y_T$ is produced, all the previous estimates, i.e., $\{Y_1, \ldots, Y_{T-1}\}$, are available to the system, and hence the prior knowledge, i.e., the probability distribution of $X_T$, to be used will be a function of these values. Therefore, the prior knowledge used in the ultimate step is a potentially different, i.e., more refined, version of the prior knowledge at the very beginning of the procedure.

We continue with a couple of remarks regarding above discussion. The updated prior knowledge has two roles in the aforementioned implementation.

First, as depicted in FIG. 1, the module (107) that computes the optimal privacy-preserving noisy stochastic mapping (109) takes extraction noise statistics (104) and updated prior knowledge (105) as two of its inputs. Further, the updated prior knowledge also plays a role in the Bayesian Framework outlined in FIG. 3. Specifically, it serves as $P_V$ in FIG. 3, which is the prior distribution on the valuable information V. Going back to the rating example at the beginning, the valuable information V will be the rating of user's likelihood of purchasing a product and the update prior knowledge $P_V$ will be a probability distribution over the possible values of said rating, which summarizes the method's prior belief regarding said rating.

Second, during next epoch of the extraction procedure, in which the goal is to extract an estimate of $X_{2T}$, one will start the extraction procedure with the posterior distribution computed by using the prior distribution representing this updated prior knowledge, along with extraction noise statistics and Bayesian Theorem, as the prior knowledge.

The operation in the preceding paragraph, is not necessarily reflected in FIG. 1, because the figure is essentially a snapshot of the operation of a dynamical system, an example of which is outlined above, during one epoch.

The statistical framework used in FIG. 3, which, in turn, is the basis of our formalizations of the privacy and accuracy in subsequent steps, is a Bayesian framework. In a nutshell, Bayesian statistics considers probability as a reasonable expectation representing the state of knowledge about an unknown quantity. In this framework, the prior knowledge, represented by a probability distribution, i.e., prior probability distribution, captures one's beliefs about the unknown quantity before any evidence becomes available. Once an evidence becomes available, one updates her belief based on this evidence, along with the prior distribution, by using the well-known Bayesian Theorem, to deduce a posterior distribution.

It should be noted that various changes and modifications to the embodiments described herein will be apparent to those skilled in the art. Such changes and modifications may be made without departing from the spirit and scope of the present invention and without diminishing its attendant advantages. For example, various embodiments of the systems and methods may be provided based on various combinations of the features and functions from the subject matter provided herein.

We claim:

1. A method of preserving privacy in a data set used to estimate information configured to be used by a third party, the method comprising the steps of:
   receiving an initial information data set and a user's privacy setting, the user's privacy setting including one or more privacy instructions defining conditions for sharing regarding the initial information data set;
   using the initial information data set and the user's privacy setting as input, producing a privacy-preserving stochastic map using an updated prior knowledge data set, the user's privacy setting, and extraction noise statistics as inputs and then applying the privacy-preserving stochastic map to an extracted initial information data set to produce an adjusted information data set; and
   using the adjusted information data set and the privacy-preserving stochastic map as inputs, applying a stochastic inference algorithm to produce an estimate of the initial information data set and an estimation error value, wherein the adjusted information data set is constrained to meet every condition defined within the user's privacy setting.

2. The method of claim 1, wherein the updated prior knowledge data set is a probability distribution over a set from which the initial information data set can take its values.

3. The method of claim 1, wherein the user's privacy setting includes a condition enabling the user to control a statistical distance between the adjusted information data set and the initial information data set.

4. The method of claim 1, wherein the stochastic inference algorithm minimizes an estimation error, wherein the estimation error is defined by an expected value of a distance between the initial information data set and the estimate of the initial information data set, where the distance is measured with respect to a given loss function.

5. The method of claim 1, wherein the privacy-preserving stochastic map minimizes the stochastic inference algorithm's estimation error subject to the user's privacy setting.

* * * * *